United States Patent
Kuribayashi et al.

[11] Patent Number: 6,121,994
[45] Date of Patent: Sep. 19, 2000

[54] IMAGE FORMING APPARATUS AND LIGHT EMITTING APPARATUS

[75] Inventors: Masaki Kuribayashi, Inagi; Noboru Koumura, Shizuoka-ken; Yukio Nagase, Shizuoka-ken; Izumi Narita, Shizuoka-ken; Seiji Mashimo, Tokyo, all of Japan

[73] Assignee: Canon Kabushiki Kaisha, Tokyo, Japan

[21] Appl. No.: 09/219,749

[22] Filed: Dec. 23, 1998

[30] Foreign Application Priority Data

Jan. 12, 1998 [JP] Japan .................................. 10-003999

[51] Int. Cl.$^7$ ....................................................... B41J 2/47
[52] U.S. Cl. ............................................. 347/237; 347/247
[58] Field of Search .................................... 347/237, 247, 347/129, 130, 131, 132, 240; 345/76, 92

[56] References Cited

U.S. PATENT DOCUMENTS

| | | | |
|---|---|---|---|
| 4,356,429 | 10/1982 | Tang ......................... | 313/503 |
| 4,539,507 | 9/1985 | VanSlyke et al. ......................... | 313/504 |
| 4,769,292 | 9/1988 | Tang et al. ......................... | 428/690 |
| 4,885,211 | 12/1989 | Tang et al. ......................... | 428/457 |
| 4,941,004 | 7/1990 | Pham et al. ......................... | 347/132 |
| 4,950,950 | 8/1990 | Perry et al. ......................... | 313/504 |
| 5,047,687 | 9/1991 | VanSlyke ......................... | 313/503 |
| 5,059,861 | 10/1991 | Littman et al. ......................... | 313/503 |
| 5,059,862 | 10/1991 | VanSlyke et al. ......................... | 313/503 |
| 5,061,617 | 10/1991 | Maskasky ......................... | 430/569 |
| 5,073,446 | 12/1991 | Scozzafava et al. ......................... | 428/323 |
| 5,075,596 | 12/1991 | Young et al. ......................... | 315/167 |
| 5,151,629 | 9/1992 | VanSlyke ......................... | 313/504 |
| 5,294,869 | 3/1994 | Tang et al. ......................... | 313/504 |
| 5,294,870 | 3/1994 | Tang et al. ......................... | 313/504 |
| 5,693,956 | 12/1997 | Shi et al. ......................... | 257/88 |
| 5,859,657 | 1/1999 | Donahue et al. ......................... | 347/240 |
| 5,888,684 | 3/1999 | Kobayashi et al. ......................... | 430/65 |

FOREIGN PATENT DOCUMENTS 0 349 265  1/1990  European Pat. Off. .

*Primary Examiner*—N. Le
*Assistant Examiner*—Lamson D. Nguyen
*Attorney, Agent, or Firm*—Fitzpatrick, Cella, Harper & Scinto

[57] ABSTRACT

A light emitting apparatus including a photosensitive member and an exposure device including a light emitting device array made up of a plurality of light emitting devices arranged in a direction of main scan across a moving direction of the photosensitive member and a switching device array made up of a plurality of switching devices arranged and connected to the light emitting devices in one-to-one relation. The switching device array is divided into a plurality of groups, a first group of leads connected in common to first terminals of the switching devices for each of the plural groups of switching devices, a second group of leads connected to second terminals of each of the switching devices, and a third group of leads, each of the third group of leads connected to third terminals of each switching device in a respective group of switching devices. The apparatus further includes a drive device for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged.

18 Claims, 12 Drawing Sheets

301 ONE-CHIP LIGHT EMITTING DEVICE ARRAY

303 GLASS SUBSTRATE

300 ONE-CHIP LIGHT EMITTING DEVICE ARRAY BOARD

302 CUT SEPARATION LINE

FIG. 11
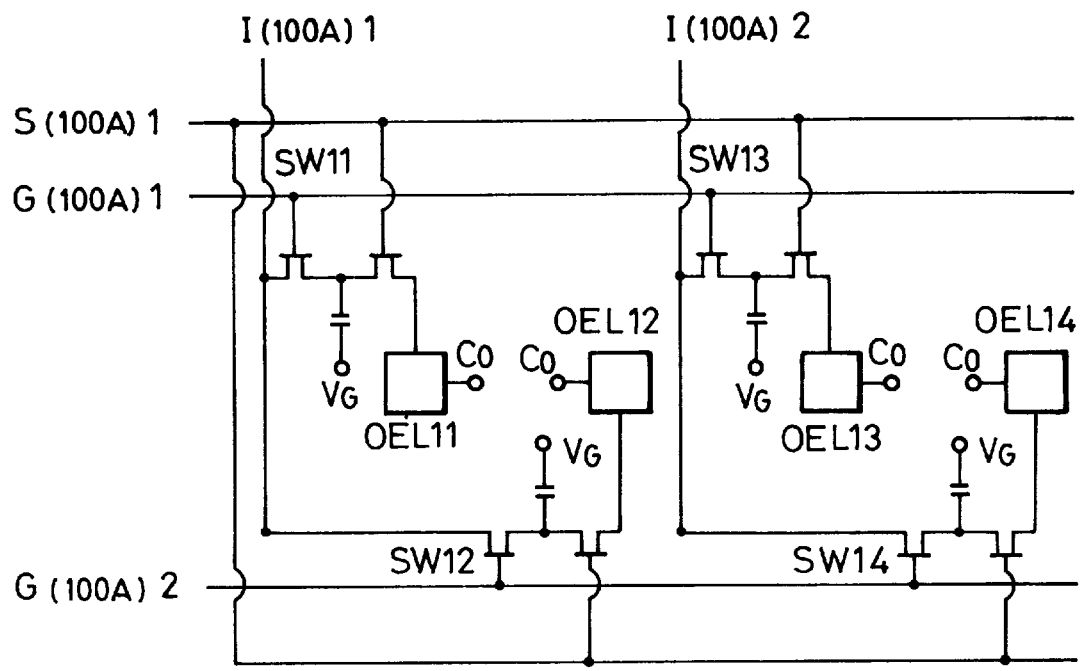
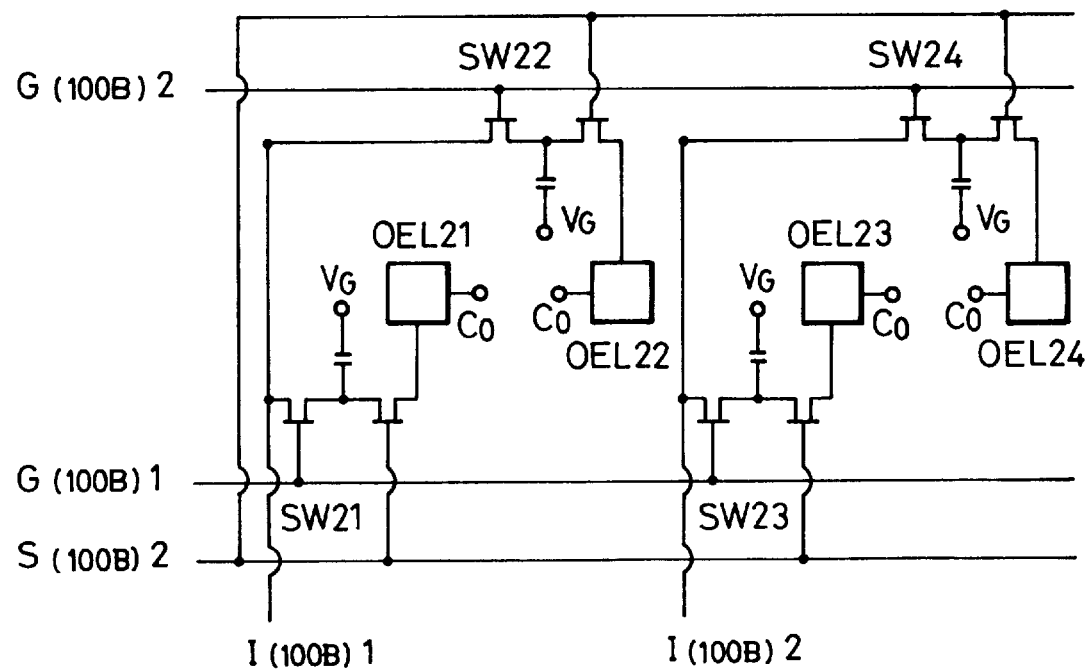

IMAGE FORMING APPARATUS AND LIGHT EMITTING APPARATUS

BACKGROUND OF THE INVENTION

1. Field of the Invention

The present invention relates to an image forming apparatus such as an electrophotographic copying machine and a light emitting apparatus for use in the image forming apparatus, and more particularly to an image forming apparatus in which a plurality of photosensitive members are arranged linearly and are used independently of one another to form cyan, magenta, yellow and black images on respective photosensitive members, these images being combined to form a color image.

2. Description of the Related Art

There is known a laser-source image forming apparatus constructed as follows. Four laser-beam light sources are provided as image exposure means respectively for four electrophotographic photosensitive members arranged linearly, and oscillation of the light sources is controlled in accordance with respective image information for cyan, magenta, yellow and black colors to form cyan, magenta, yellow and black electrostatic latent images on the four electrophotographic photosensitive members in a one-to-one relation. These latent images are developed and the resulting developed images are combined to form a color image.

An LED-source image forming apparatus is also known which employs, as light sources for forming cyan, magenta, yellow and black electrostatic latent images, four LED light sources disposed for illuminating respective photosensitive members, instead of the above-described laser-beam light.

At the present state of art, however, the laser-source image forming apparatus has difficulty in controlling the four laser-beam light sources disposed respectively for the four photosensitive members to emit laser beams in an exactly aligned relation with each other in both the direction of main scan and the direction of sub-scan so that cyan, magenta, yellow and black images are combined in alignment with each other to create a desired color image.

On the other hand, the LED-source image forming apparatus can relatively easily meet the requirement of emitting rays of light in an exactly aligned relation with one another in both the direction of main scan and the direction of sub-scan, but experiences other problems. Particularly, the apparatus is expensive because LEDs are themselves relatively expensive and, in addition, an LED light source requires a linked LED device comprising a plurality of LED chips linked to each other linearly. These LED chips differ in luminescent characteristics from one chip to another, and such a linked LED device is used to expose an image forming area in the direction of main scan across movement of the photosensitive member. This causes exposure conditions to differ depending on the luminescent characteristics of individual chips, resulting in poor image reproducibility in the direction of main scan.

In an electrophotographic copying machine adapted for forming a color image, it is required to arrange the linked LED device for each of a plurality of photosensitive members. In such a color copying machine, the plurality of linked LED devices disposed for respective photosensitive members also differ in their luminescent characteristics. This situation results in a severe demand for proper adjustment of luminescent characteristics between linked LED devices disposed to illuminate respective photosensitive members in a one-to-one relation.

SUMMARY OF THE INVENTION

An object of the present invention is to overcome the problem of variations of luminescent characteristics in the direction of main scan that has been experienced in conventional image forming apparatuses using a linked LED device as an exposure unit, particularly an electrophotographic copying machine. Additional objects of the invention are to greatly reduce the number of driving leads and the number of driver chips for use in a print head, to increase the luminance of emitted light to a sufficient level, and to remarkably raise the process speed of the electrophotographic copying machine.

Another object of the present invention is to greatly increase a period of time during which a light emitting device can emit light, and to remarkably prolong the useful life of the print head.

To achieve the above objects, according to a first aspect of the present invention, an image forming apparatus comprises (a) a photosensitive member, (b) exposure means comprising a light emitting device array made up of a plurality of light emitting devices arranged in a direction of main scan across the moving direction of the photosensitive member, a switching device array made up of a plurality of switching devices arranged and connected to the light emitting devices in a one-to-one relation, the switching device array being divided into a plurality of groups, a first group of leads connected in common to first terminals of the switching devices for each of the plural groups of switching devices, a second group of leads connected to second terminals of each of the switching devices, a third group of leads, each of the third group of leads connected to third terminals of each switching device in a respective group of switching devices, and simultaneous light emitting circuits for making the light emitting device array emit light at the same time, the photosensitive member being exposed upon simultaneous emission of light from the light emitting device array, and (c) drive means for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged at the same time in response to the voltage signal with one polarity, and then operating the simultaneous light emitting circuits to apply a second scan signal to the first group of leads, a voltage signal with the other polarity to the third group of leads in synch with the second scan signal, and a second discharge signal to the second group of leads, thereby causing the capacitors to be discharged at the same time in response to the voltage signal with the other polarity.

According to a second aspect of the present invention, an image forming apparatus comprises (a) a photosensitive member, (b) exposure means including a plurality of light-emitting-device array blocks each comprising a light emitting device array made up of a plurality of light emitting devices arranged in a direction of main scan across the moving direction of the photosensitive member, a switching device array made up of a plurality of switching devices arranged and connected to the light emitting devices in one-to-one relation, the switching device array being divided into a plurality of groups, a first group of leads connected in common to first terminals of the switching devices for each of the plural groups of switching devices, a second group of leads connected to second terminals of each of the switching devices, a third group of leads, each of the third group of leads connected to third terminals of each switching device in a respective group of switching devices, and simultaneous light emitting circuits for making the light emitting device array emit light at the same time, (c) first drive means for making each of the plurality of light-emitting-device array blocks emit light at the same time and operating the plurality of light-emitting-device array blocks successively on the block-by-block basis, and (d) second drive means for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged at the same time in response to the voltage signal with one polarity, and then operating the simultaneous light emitting circuits to apply a second scan signal to the first group of leads, a voltage signal with the other polarity to the third group of leads in synch with the second scan signal, and a second discharge signal to the second group of leads, thereby causing the capacitors to be discharged at the same time in response to the voltage signal with the other polarity.

According to a third aspect of the present invention, an image forming apparatus comprises (a) a photosensitive member, (b) exposure means comprising a light emitting device array made up of light emitting devices arranged in plural columns and in plural rows with respect to the photosensitive member, a switching device array made up of a plurality of switching devices connected to the light emitting devices in plural rows in one-to-one relation and arranged in plural rows corresponding to the plural rows of light emitting devices on a row-by-row basis, the switching devices being divided into a plurality of groups for each row, a first group of leads connected in common to first terminals of the switching devices for each of the plural groups of switching devices, a second group of leads connected to second terminals of each of the switching devices, a third group of leads, each of the third group of leads connected to third terminals of each switching device in a respective group of switching devices, and simultaneous light emitting circuits for making the light emitting device array emit light at the same time, the photosensitive member being exposed upon simultaneous emission of light from the light emitting device array, and (c) drive means for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged at the same time in response to the voltage signal with one polarity, and then operating the simultaneous light emitting circuits to apply a second scan signal to the first group of leads, a voltage signal with the other polarity to the third group of leads in synch with the second scan signal, and a second discharge signal to the second group of leads, thereby causing the capacitors to be discharged at the same time in response to the voltage signal with the other polarity.

According to a fourth aspect of the present invention, an image forming apparatus comprises (a) a photosensitive member, (b) exposure means comprising a light emitting device array made up of light emitting devices arranged in plural columns and in plural rows with respect to the photosensitive member, a switching device array made up of a plurality of switching devices connected to the light emitting devices in plural rows in one-to-one relation and arranged in plural rows corresponding to the plural rows of light emitting devices on a row-by-row basis, the switching devices being divided into a plurality of groups for each row, a first group of leads arranged for each row and connected in common to first terminals of the switching devices for each of the plural groups of switching devices, plural second groups of leads connected to second terminals of the switching devices, each of the plural second groups connected to respective ones of the switching devices in each row and wired independently of one another for each row, a third group of leads connected to third terminals of each of the switching devices for a row and simultaneous light emitting circuits for making the light emitting device array emit light at the same time, the photosensitive member being exposed upon simultaneous emission of light from the light emitting device array, (c) first drive means for operating the simultaneous light emitting circuits to apply a first scan signal to the first group of leads in at least one of the plural rows of the first group of leads, a voltage signal with one polarity to the second group of leads in at least one of the plural second groups of leads in synch with the first scan signal, and a discharge signal to the third group of leads, thereby causing capacitors to be discharged at the same time in response to the voltage signal with one polarity, and then operating the simultaneous light emitting circuits to apply a second scan signal to the first group of leads in the at least one row, a voltage signal with the other polarity to the at least one second group of leads in synch with the second scan signal, and a second discharge signal to the third group of leads, thereby causing the capacitors to be discharged at the same time in response to the voltage signal with the other polarity, and (d) second drive means for operating the simultaneous light emitting circuits to apply the first scan signal to another of the plural rows of the first group of leads, a voltage signal with the other polarity to another of the plural second groups of leads in synch with the first scan signal, and the discharge signal to another of the third group of leads, thereby causing capacitors to be discharged at the same time in response to the voltage signal with the other polarity, and then operating the simultaneous light emitting circuits to apply the second scan signal to that another row of the first group of leads, a voltage signal with one polarity to that another second group of leads in synch with the second scan signal, and the second discharge signal to the another of the third group of leads, thereby causing the capacitors to be discharged at the same time in response to the voltage signal with one polarity.

According to a fifth aspect of the present invention, a light emitting apparatus comprises (a) exposure means comprising a light emitting device array made up of a plurality of light emitting devices arranged in one direction, a switching device array made up of a plurality of switching devices arranged and connected to the light emitting devices in one-to-one relation, the switching device array being divided into a plurality of groups, a first group of leads connected in common to first terminals of the switching devices for each of the plural groups of switching devices, a second group of leads connected to second terminals of each of the switching devices, a third group of leads, each of the third group of leads connected to third terminals of each switching device in a respective group of switching devices, and simultaneous light emitting circuits for making the light emitting device array emit light at the same time, thereby effecting simultaneous emission of light from the light emitting device array, and (b) drive means for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged at the same time in response to the voltage signal with one polarity, and then operating the simultaneous light emitting circuits to apply a second scan signal to the first group of leads, a voltage signal with the other polarity to the third group of leads in synch with the second scan signal, and a second discharge signal to the second group of leads, thereby causing the capacitors to be discharged at the same time in response to the voltage signal with the other polarity.

According to a sixth aspect of the present invention, a light emitting apparatus comprises (a) exposure means including a plurality of light-emitting-device array blocks each comprising a light emitting device array made up of a plurality of light emitting devices arranged in one direction, a switching device array made up of a plurality of switching devices arranged and connected to the light emitting devices in one-to-one relation, the switching device array being divided into a plurality of groups, a first group of leads connected in common to first terminals of the switching devices for each of the plural groups of switching devices, a second group of leads connected to second terminals of each of the switching devices, a third group of leads, each of the third group of leads connected to third terminals of each switching device in a respective group of switching devices, and simultaneous light emitting circuits for making the light emitting device array emit light at the same time, (b) first drive means for making each of the plurality of light-emitting-device array blocks emit light at the same time and operating the plurality of light-emitting-device array blocks successively on a block-by-block basis, and (c) second drive means for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged at the same time in response to the voltage signal with one polarity, and then operating the simultaneous light emitting circuits to apply a second scan signal to the first group of leads, a voltage signal with the other polarity to the third group of leads in synch with the second scan signal, and a second discharge signal to the second group of leads, thereby causing the capacitors to be discharged at the same time in response to the voltage signal with the other polarity.

According to a seventh aspect of the present invention, a light emitting apparatus comprises (a) exposure means comprising a light emitting device array made up of light emitting devices arranged in plural columns and in plural rows, a switching device array made up of a plurality of switching devices connected to the light emitting devices in plural rows in one-to-one relation and arranged in plural rows corresponding to the plural rows of light emitting devices on a row-by-row basis, the switching devices being divided into a plurality of groups for each row, a first group of leads connected in common to first terminals of the switching devices for each of the plural groups of switching devices, a second group of leads connected to second terminals of each of the switching devices, a third group of leads, each of the third group of leads connected to third terminals of each switching device in a respective group of switching devices, and simultaneous light emitting circuits for making the light emitting device array emit light at the same time, thereby effecting simultaneous emission of light from the light emitting device array, and (b) drive means for operating the simultaneous light emitting circuits to apply a first scan signal to the first group of leads, a voltage signal with one polarity to the third group of leads in synch with the first scan signal, and a discharge signal to the second group of leads, thereby causing capacitors to be discharged at the same time in response to the voltage signal with one polarity, and then operating the simultaneous light emitting circuits to apply a second scan signal to the first group of leads, a voltage signal with the other polarity to the third group of leads in synch with the second scan signal, and a second discharge signal to the second group of leads, thereby causing the capacitors to be discharged at the same time in response to the voltage signal with the other polarity.

According to an eighth aspect of the present invention, a light emitting apparatus comprises (a) exposure means comprising a light emitting device array made up of light emitting devices arranged in plural columns and in plural rows, a switching device array made up of a plurality of switching devices connected to the light emitting devices in plural rows in one-to-one relation and arranged in plural rows corresponding to the plural rows of light emitting devices on a row-by-row basis, the switching devices being divided into a plurality of groups for each row, a first group of leads arranged for each row and connected in common to first terminals of the switching devices for each of the plural groups of switching devices, plural second groups of leads connected to second terminals of the switching devices, each of the plural second groups connected to respective ones of the switching devices in each row and wired independently of one another for each row, a third group of leads connected to third terminals of each of the switching devices for a row and simultaneous light emitting circuits for making the light emitting device array emit light at the same time, thereby effecting simultaneous emission of light from the light emitting device array, (b) first drive means for operating the simultaneous light emitting circuits to apply a first scan signal to the first group of leads in at least one of the plural rows of the first group of leads, a voltage signal with one polarity to the second group of leads in at least one of the plural second groups of leads in synch with the first scan signal, and a discharge signal to the third group of leads, thereby causing capacitors to be discharged at the same time in response to the voltage signal with one polarity, and then operating the simultaneous light emitting circuits to apply a second scan signal to the first group of leads in the at least one row, a voltage signal with the other polarity to the at least one second group of leads in synch with the second scan signal, and a second discharge signal to the third group of leads, thereby causing the capacitors to be discharged at the same time in response to the voltage signal with the other polarity, and (c) second drive means for operating the simultaneous light emitting circuits to apply the first scan signal to another of the plural rows of the first group of leads, a voltage signal with the other polarity to another of the plural second groups of leads in synch with the first scan signal, and the discharge signal to another of the third group of leads, thereby causing capacitors to be discharged at the same time in response to the voltage signal with the other polarity, and then operating the simultaneous light emitting circuits to apply the second scan signal to that another row of the first group of leads, a voltage signal with one polarity to that another second group of leads in synch with the second scan signal, and the second discharge signal to the another of the third group of leads, thereby causing the capacitors to be discharged at the same time in response to the voltage signal with one polarity.

In a first preferred embodiment of the present invention, the light emitting devices each comprise a device having organic luminescent device.

In a second preferred embodiment of the present invention, the photosensitive member comprises an organic or inorganic electrophotographic photosensitive member.

In a fourth preferred embodiment of the present invention, the switching devices comprise thin film transistors with the first terminals serving as gate terminals and the second terminals serving as source terminals.

In a fifth preferred embodiment of the present invention, the switching device array is in the one-chip form.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 11 is an equivalent circuit diagram of the light emitting device array shown in FIG. 10.

DETAILED DESCRIPTION OF THE PREFERRED EMBODIMENTS

Figure 1:
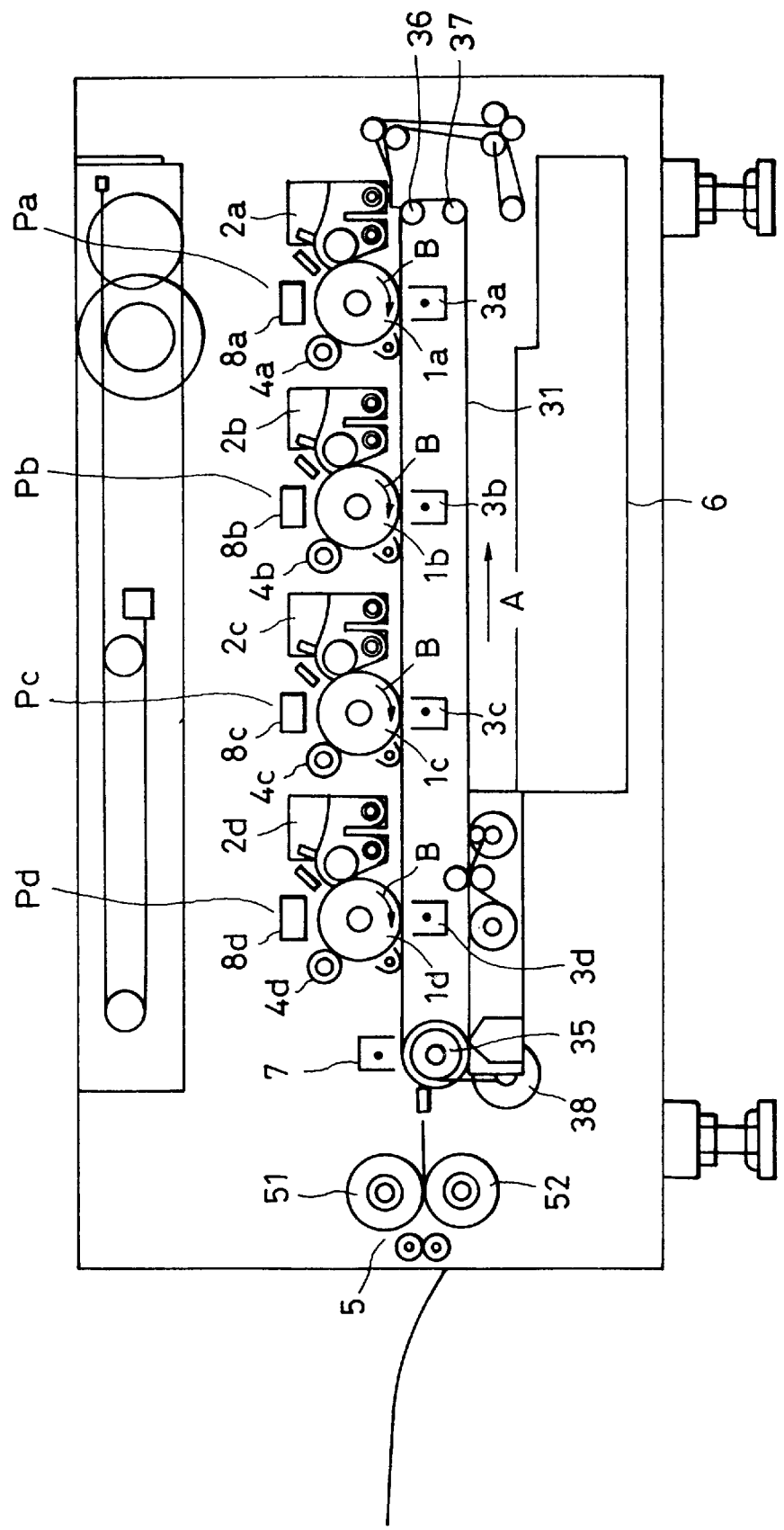
FIG. 1 is a sectional view of an image forming apparatus according to the present invention.

Preferred embodiments of the present invention will be described hereunder with reference to the drawings. FIG. 1 is a sectional view of an image forming apparatus, particularly a color electrophotographic copying machine, in which a light emitting apparatus according to the present invention is used as an exposure unit.

In the color electrophotographic copying machine shown in FIG. 1, materials on which images are to be printed, such as sheets of papers, are stocked in a cassette 6 and then supplied from the cassette 6 to a feed section one by one in accordance with the operation of forming an image (called also printing). The feed section comprises a feed belt 31 stretched between a drive roller 35 on one side and driven rollers 36, 37 on the opposite side. The drive roller 35 is driven by a motor 38 for rotation, enabling the feed belt 31 to reciprocate between the drive roller 35 and the driven rollers 36, 37. The lower portion of the feed belt 31 moves in the direction indicated by the arrow A in FIG. 1.

Along the feed belt 31, there are provided four image forming units Pa, Pb, Pc and Pd. The image forming units Pa, Pb, Pc and Pd are of the same construction, and hence the construction of the image forming unit Pa will be described below, by way of example, in brief.

In the image forming unit Pa, a cylindrical photosensitive member, i.e., a photosensitive drum 1a, is positioned near the feed belt 31 and is rotated in the direction of the arrow B. When the photosensitive drum 1a is rotated, a photosensitive layer on the drum surface is uniformly charged by a primary charger 4a comprising a contact charger. After that, the charged photosensitive layer is exposed to a light image representing a yellow component of a document by light emitted from exposure means 8a. Exposure means 8a comprises a one-chip light emitting device array which is adapted to expose an entire main scan area of the photosensitive drum 1a, thereby forming an electrostatic latent image of the yellow component. A portion of the drum surface in which the yellow latent image has been formed is progressively rotated to move to the position of a yellow developer 2a. In that position, the yellow latent image is developed to be made visible by a yellow toner supplied from the yellow developer 2a.

With the continued rotation of the photosensitive drum 1a, a resulting yellow toner image reaches a transfer position where a corona charger 3a is disposed in opposing relation to the drum 1a with the feed belt 31 therebetween. As the yellow toner image reaches the transfer position, the print material is fed to the transfer position with the feed belt 31. A transfer bias voltage is then applied to the corona charger 3a, whereupon the yellow toner image on the photosensitive drum 1a is transferred onto the print material as the photosensitive drum 1a rotates.

Next, with the further continued rotation of the photosensitive drum 1a, the toner remaining on the drum surface is removed by a cleaning device (not shown), thereby making the drum 1a ready for a next image forming process. In parallel, the print material onto which the yellow toner image has been transferred is fed with the feed belt 31 to a printing section of the image forming unit Pb for printing a second color.

The image forming unit Pb is of the same construction as the image forming unit Pa. In a similar manner as described above, therefore, the charged photosensitive layer of drum 1b is exposed to a light image representing a magenta component of the document by light emitted from exposure means 8b. Again, exposure means 8b comprises a one-chip light emitting device array, thereby forming an electrostatic latent image of the magenta component. The magenta latent image is then developed by magenta toner and a resulting magenta toner image is transferred at the transfer position onto the print material so as to be superposed on the toner yellow image. In a similar manner, while continuously feeding the print material, an electrostatic latent image of the cyan component and an electrostatic latent image of the black component are formed in the image forming units Pc and Pd successively by light emitted from exposure means 8c and 8d, each comprising a one-chip light emitting device array. Accordingly, in subsequent steps, a cyan toner image and a black toner image are transferred onto the print material superimposed on preceding toner images. Finally, a color image is formed as a result of the four toner images being superposed onto one another on the print material.

As with the image forming unit Pa, the image forming units Pb, Pc and Pd comprise respectively photosensitive drums 1b, 1c and 1d, a magenta developer 2b, a cyan developer 2c and a black developer 2d, corona chargers 3b, 3c and 3d, as well as primary chargers 4b, 4c and 4d each comprising a contact charger.

After the processes in the image forming units Pa, Pb, Pc and Pd are all completed, the print material having the four-color toner image transferred onto it is further fed to a separating/charge-removing unit 7 where the remaining charges on the print material are removed and the print material is then separated from the feed belt 31. The separated print material is sent to a fuser 5 comprising a fusing roller 51 and a press roller 52. In the fuser 5, the print material is usually subject to pressure and heating while passing between the rollers 51 and 52 which are heated to a predetermined temperature, so that the transferred toner images are permanently fixed on the print material. Thereafter, the print material is discharged out of the copying machine.

Figure 2:
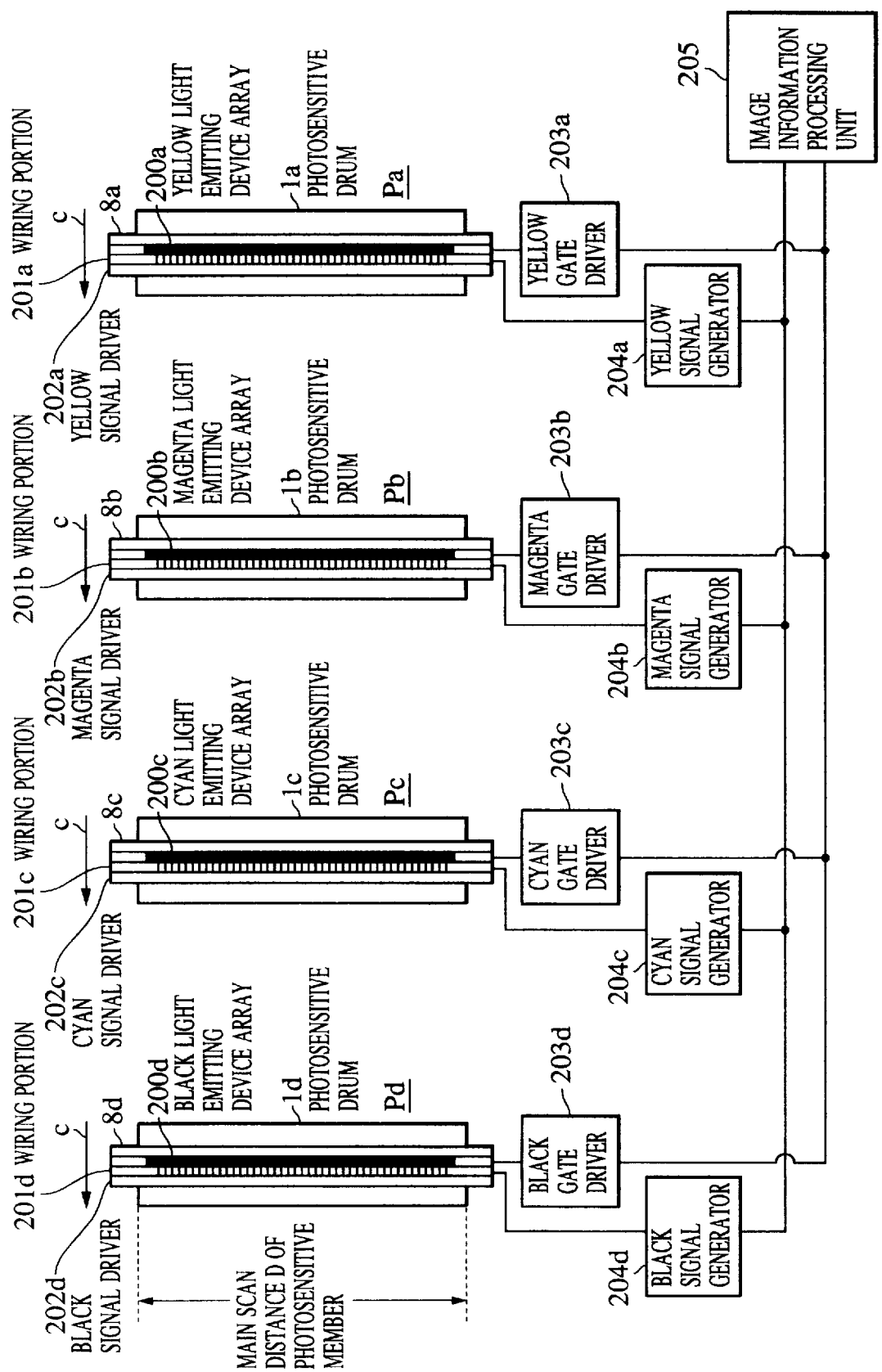
FIG. 2 is a block diagram of an exposure section used in the image forming apparatus according to the present invention.

FIG. 2 is a block diagram showing details of the image forming units Pa, Pb, Pc and Pd shown in FIG. 1.

In the image forming units Pa, Pb, Pc and Pd, the exposure means 8a, 8b, 8c and 8d disposed in association with the photosensitive drums 1a, 1b, 1c and 1d include, respectively, a yellow light emitting device array 200a, a magenta light emitting device array 200b, a cyan light emitting device array 200c, and a black light emitting device array 200d. The yellow light emitting device array 200a, the magenta light emitting device array 200b, the cyan light emitting device array 200c, and the black light emitting device array 200d are connected respectively to a yellow signal driver (IC) 202a, a magenta signal driver (IC) 202b, a cyan signal driver (IC) 202c, and a black signal driver (IC) 202d through wiring portions 201a, 201b, 201c and 201d, whose leads are formed at a high density. With the operation of those drivers, the light emitting devices are each controlled to emit light or not to emit light. The operation of the light emitting device arrays to emit light therefrom can be controlled in response to respective image signals from a yellow signal generator 204a, a magenta signal generator 204b, a cyan signal generator 204c, and a black signal generator 204d. The light emitting devices used in each of the yellow light emitting device array 200a, the magenta light emitting device array 200b, the cyan light emitting device array 200c, and the black light emitting device array 200d are arranged linearly to constitute an array with a high resolution of, e.g., 1200 dpi.

The yellow light emitting device array 200a, the magenta light emitting device array 200b, the cyan light emitting device array 200c, and the black light emitting device array 200d are associated with switching device circuits and sample-and-hold circuits described later. The timing of gate lines in the switching device circuit and the sample-and-hold circuit is controlled by corresponding ones of a yellow gate driver 203a, a magenta gate driver 203b, a cyan gate driver 203c, and a black gate driver 203d. Then, control of the above gate driving operation, and control of image signals such as yellow, magenta, cyan and black signals are executed by an image information processing unit 205 in a CPU (not shown).

The yellow light emitting device array 200a, the magenta light emitting device array 200b, the cyan light emitting device array 200c, and the black light emitting device array 200d used in the present invention comprise each a one-chip light emitting device array which is arranged so as to cover the full range of a main scan distance D in the direction of main scan across rotating movement of the photosensitive drums 1a, 1b, 1c and 1d. The light emitting device arrays 200a, 200b, 200c and 200d are each formed by integrating a plurality of light emitting devices in one chip such that the light emitting device arrays have a resolution higher than 600 dpi, e.g., 1200 or more dpi, and cover the full range of the main scan distance D of the photosensitive member.

In a preferred specific example of the present invention, the one-chip light emitting device arrays for use as the yellow light emitting device array 200a, the magenta light emitting device array 200b, the cyan light emitting device array 200c, and the black light emitting device array 200d are obtained by forming each array on a single board and cutting the board for separation into the four arrays, as described later.

Further, the arrow C in FIG. 2 indicates the direction of sub-scan in which the photosensitive member is rotated while passing the light emitting device array. The photosensitive drums 1a, 1b, 1c and 1d are formed of aluminum pipes having an equal diameter (for example, 60 cm, 30 cm or 20 cm) and coated with the same type of photosensitive layers (for example, identical organic photoelectric material layers or identical a-Si photosensitive layers for all the four drums). Thus, the photosensitive drums 1a, 1b, 1c and 1d are all set to have the same moving speed in the direction of sub-scan.

Figure 3:
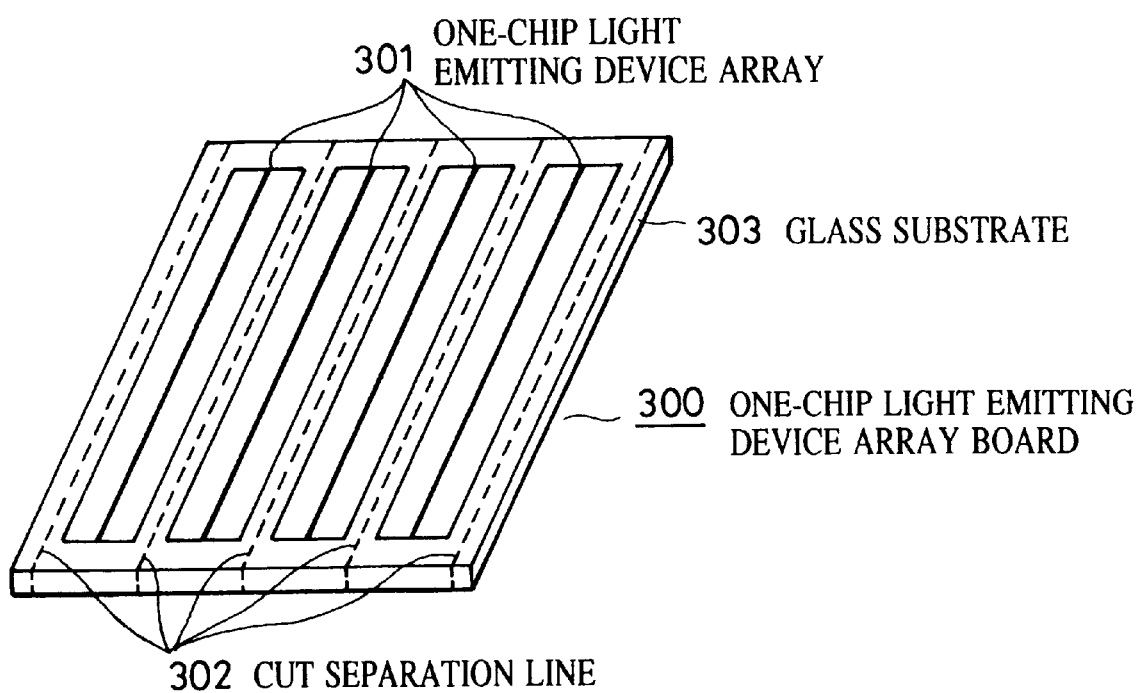
FIG. 3 is a perspective view of one-chip light emitting device arrays on a single board for use in conjunction with the present invention.

FIG. 3 is a perspective view of a one-chip light emitting device array board 300 fabricated by forming four one-chip light emitting device arrays 301, which are used as the yellow light emitting device array 200a, the magenta light emitting device array 200b, the cyan light emitting device array 200c, and the black light emitting device array 200d, all on a single glass substrate 303. FIG. 3 shows a condition before the step of dividing the array board 300, i.e., the glass substrate 303, into the four arrays along cut separation lines 302.

The size of the glass substrate 303 used in the present invention has no special limitations so long as the substrate has size enough to fabricate the light emitting arrays on it in the one-chip form.

Figure 4:
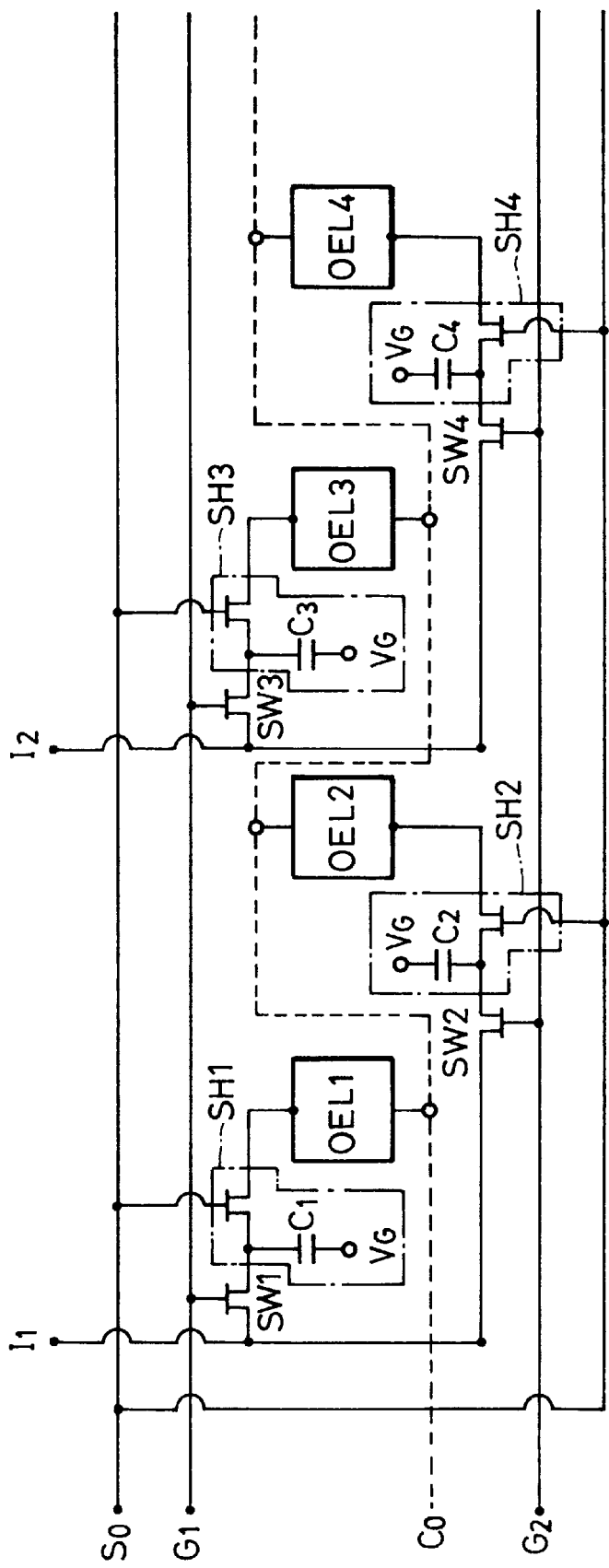
FIG. 4 is an equivalent circuit diagram of each of the light emitting device arrays shown in FIG. 3.

FIG. 4 shows an equivalent circuit diagram of each of the light emitting device arrays 301 shown in FIG. 3. A plurality of light emitting devices OEL1, OEL2, OEL3, OEL4, etc. are arranged in a line extending in the direction of main scan across the moving direction of the photosensitive drum, when the photosensitive drum is mounted in an electrophotographic copying machined and rotated, the light emitting devices being connected to form an active matrix circuit. In the active matrix circuit, thin film transistors are suitably used as switching devices SW1, SW2, SW3, SW4, etc. A group of light emitting devices (first group) defined as comprising the light emitting devices OEL1, OEL3, . . . , OEL(2N−1) in odd number positions are connected to respective gate terminals of the switching devices SW1, SW3, . . . , SW(2N−1) in odd number positions and then connected in common to a gate line G1. A group of light emitting devices (second group) defined as comprising the light emitting devices OEL2, OEL4, . . . , OEL(2N) in even number positions are connected to respective gate terminals of the switching devices SW2, SW4, . . . , SW(2N) in even number positions and then connected in common to a gate line G2. Note that "N" denotes an integer (1, 2, 3, 4, 5, etc.). Further, in the active matrix circuit, pairs of the adjacent light emitting devices OEL1-OEL2, OEL3-OEL4, . . . , OEL(2N−1)-OEL(2N) are connected to respective source terminals of pairs of the adjacent switching devices SW1-SW2, SW3-SW4, . . . , SW(2N−1)-SW(2N), and then connected in common to source lines I1, I2, etc. Counter electrodes of the light emitting devices OEL1, OEL2, OEL3, OEL4, etc. are connected in common to a common line C0 to serve as anodes or cathodes of the light emitting devices OEL1, OEL2, OEL3, OEL4, etc., respectively.

In a preferred example of the present invention, sample-and-hold circuits SH1, SH2, SH3, SH4, etc. are connected between the switching devices SW1, SW2, SW3, SW4, etc. and the light emitting devices OEL1, OEL2, OEL3, OEL4, etc. The sample-and-hold circuits SH1, SH2, SH3, SH4, etc. have, respectively, charge storing capacitors $C_1$, $C_2$, $C_3$, $C_4$, etc. The charge storing capacitors $C_1$, $C_2$, $C_3$, $C_4$, etc. are connected to sample-and-hold switching devices of which gates are connected to a common connecting line S0, so that the gates of the sample-and-hold switching devices are turned on and off at predetermined time intervals in synch with the rotation of the photosensitive drum. Counter electrodes of the charge storing capacitors $C_1$, $C_2$, $C_3$, $C_4$, etc. are grounded or supplied with a predetermined DC bias $V_G$. In addition, the amount of the predetermined DC bias $V_G$ can be set variable depending on, e.g., the external temperature or the service time (life time).

Figure 5:
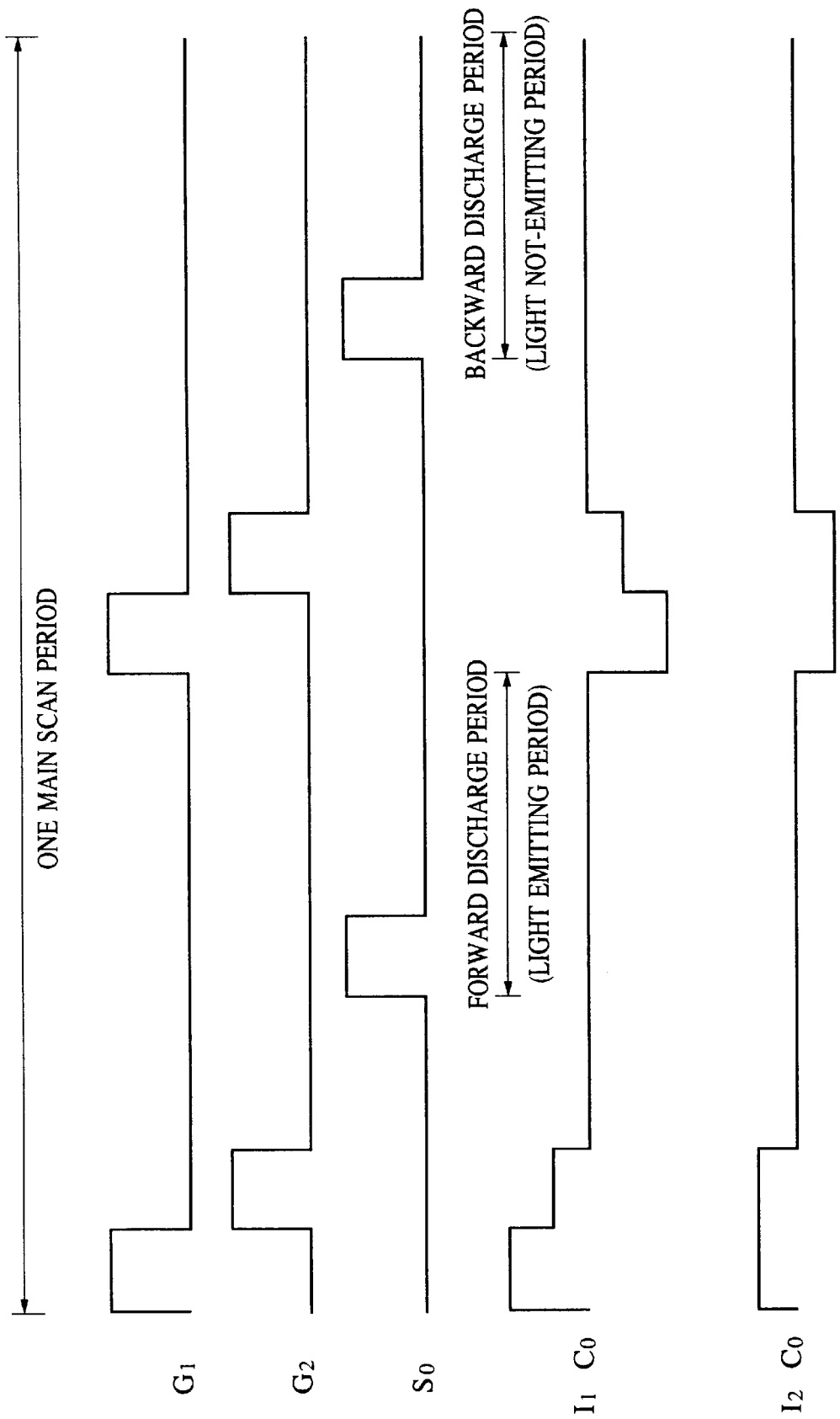
FIG. 5 is a chart of a driving sequence for the light emitting device array shown in FIG. 4.

FIG. 5 is a chart for driving the active matrix circuit shown in FIG. 4. In the first half of one main scan period corresponding to one scan period of a laser beam irradiated on the photosensitive drum, pulses of one-polarity voltage signals (the polarity being defined on the basis of a voltage applied to the connecting line C0), which have crest values corresponding to image signals, are applied to the source lines I1, I2 in synch with gate-on pulses applied to the gate lines G1, G2. The crest values of the one-polarity voltage signals are set depending on the gradation information derived from image information. In another preferred embodiment, the pulse width or the pulse number of the one-polarity voltage signals may be changed depending on the gradation information derived from image information. Gate-on pulses for setting the gates of the sample-and-hold switching devices to be open are applied to the connecting line S0 so that electric charges, which are stored as image information in the charge storing capacitors $C_1$, $C_2$, $C_3$, $C_4$, etc., are forward discharged to the light emitting devices OEL1, OEL2, OEL3, OEL4, etc. for making them emit light. The timing at which the gate pulses are applied is set to start the light emitting operation after sufficient amounts of electric charges have been stored in the charge storing capacitors $C_1$, $C_2$, $C_3$, $C_4$, etc.

In the subsequent second half of one main scan period, voltage signals having the opposite polarity to that of the pulses of the one-polarity voltage signals, which have been used in the first half period, are applied to the source lines I1, I2 in synch with the gate-on pulses applied to the gate lines G1, G2. On this occasion, the first-half voltage signals and the second-half voltage signals are preferably set such that the voltage average of both the signals is zero and the DC component is as small as possible. The gate-on pulses are applied to the connecting line S0 in a like manner to the operation in the first half period so that electric charges stored in the charge storing capacitors $C_1$, $C_2$, $C_3$, $C_4$, etc. are backward discharged with respect to the light emitting devices OEL1, OEL2, OEL3, OEL4, etc., thereby establishing a condition not to emit light.

Figure 6:
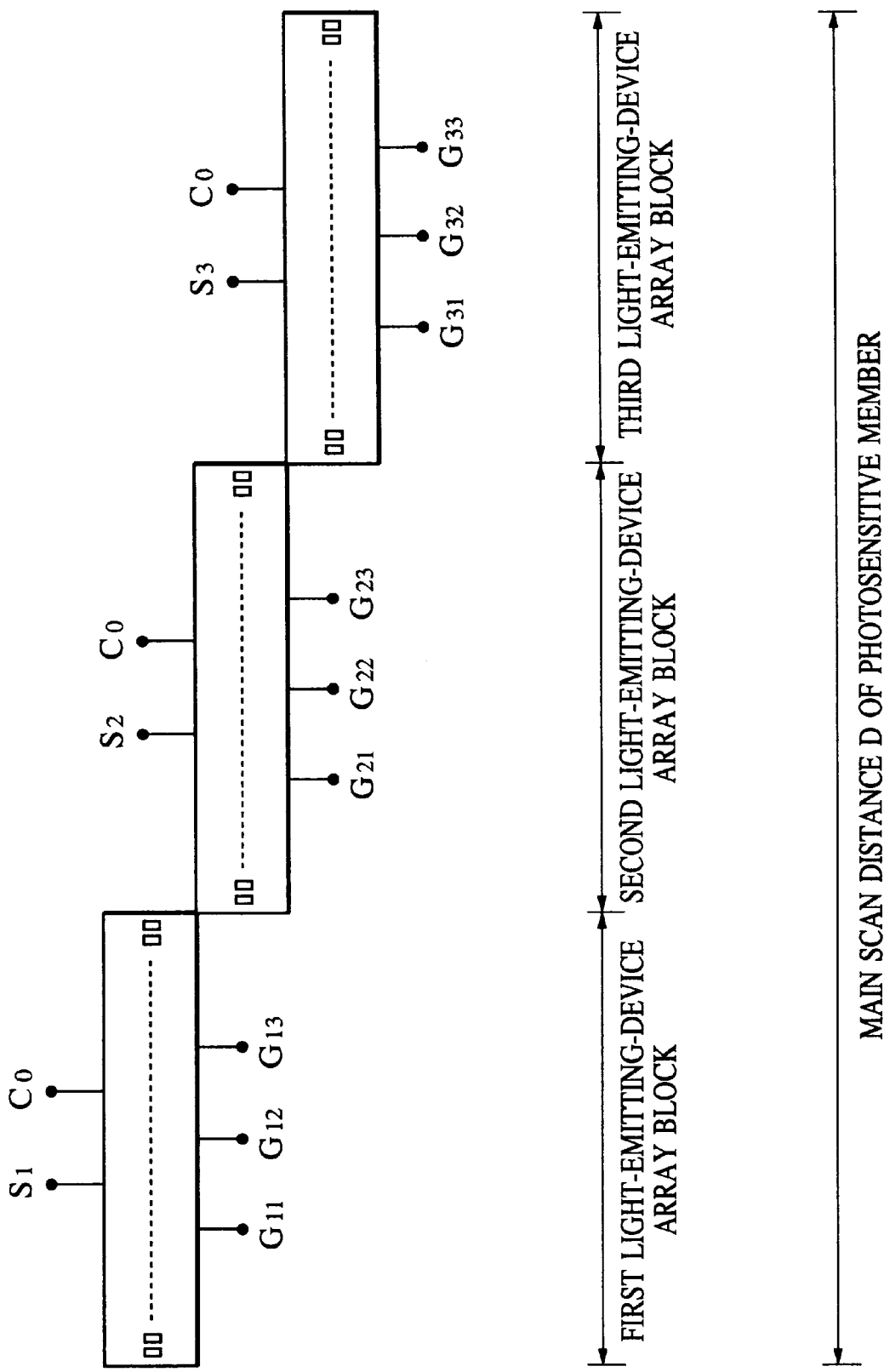
FIG. 6 is a block diagram of a light emitting device array for use in conjuntion with the present invention.

FIG. 6 shows one preferable example of the light emitting device array for use in the present invention. This light emitting device array is divided into three blocks, i.e., a first light-emitting-device array block, a second light-emitting-device array block, and a third light-emitting-device array block. The circuit shown in FIG. 4 is built in each block. In the example of FIG. 6, the circuit has wiring adapted for time-sharing driving with the time-sharing number being three. A first gate line block ($G_{11}$, $G_{12}$, $G_{13}$), a second gate line block ($G_{21}$, $G_{22}$, $G_{23}$), and a third gate line block ($G_{31}$, $G_{32}$, $G_{33}$) are disposed in one-to-one relation to the blocks. Source lines corresponding to the information signal lines may be wired in common to each of the light-emitting-device array blocks. This contributes to reducing the number of leads to be wired. Also, the information signal lines may be wired for the light-emitting-device array blocks independently of one another. This contributes to greatly shortening a time necessary for completing one main scan period.

The first light-emitting-device array block, the second light-emitting-device array block, and the third light-emitting-device array block are each operated in a first half scan and a second half scan. Gate-on pulses are applied to connecting lines $S_1$, $S_2$ and $S_3$ so that forward discharge occurs in the first half scan and backward discharge occurs in the second half scan. As an alternative, the gate-on pulses may be applied to cause forward discharge in the first half scan and backward discharge in the second half scan.

Figure 7:
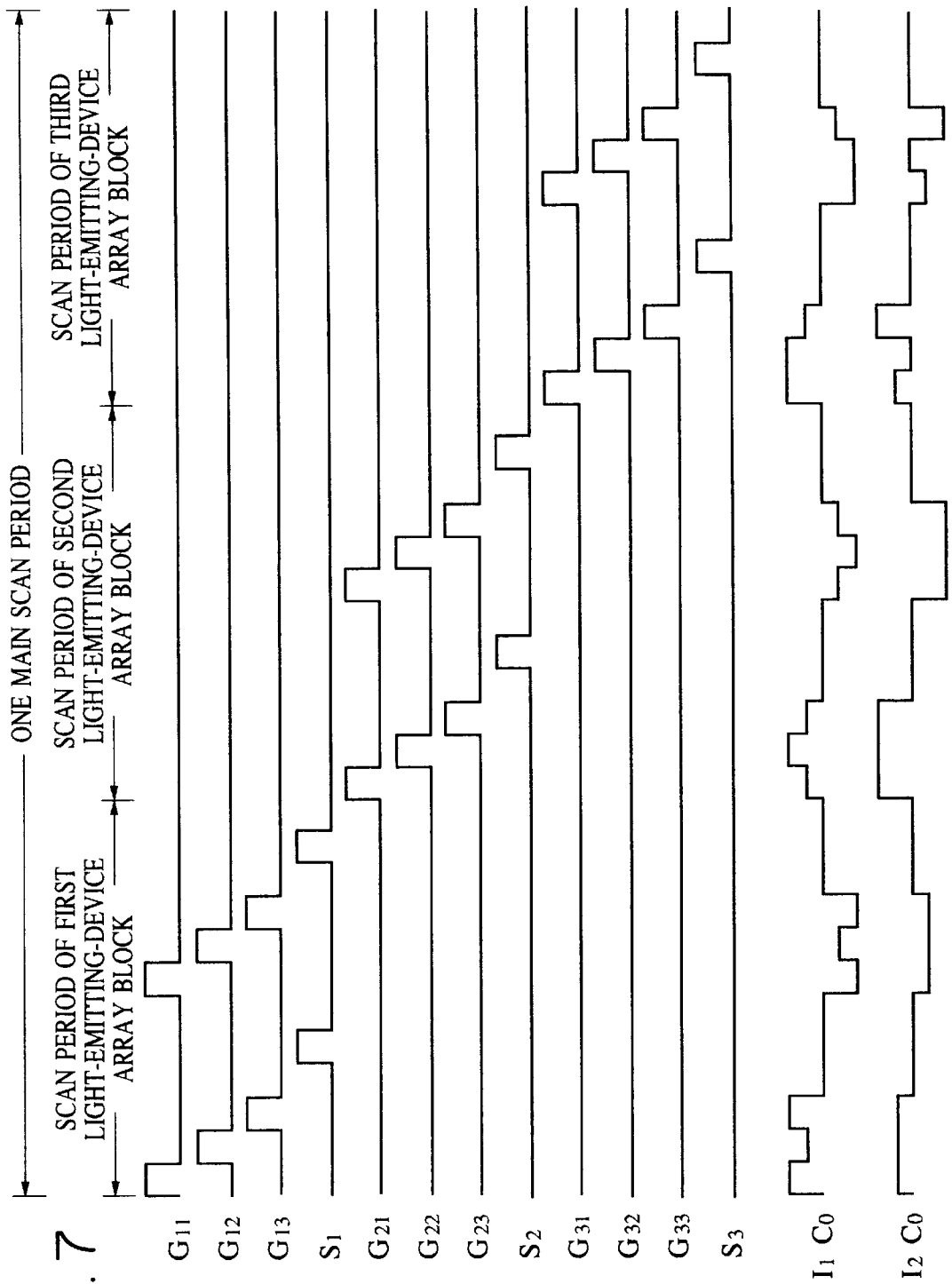
FIG. 7 is a chart of a driving sequence for the light emitting device array shown in FIG. 6.

FIG. 7 shows one example of driving the light emitting device array shown in FIG. 6. When application of the gate-on pulses to the first gate line block ($G_{11}$, $G_{12}$, $G_{13}$) is started, electric charges start being charged into the charge storing capacitors. Then, when application of the gate-on pulses to the connecting line $S_1$ is started, the electric charges start being forward discharged from the charge storing capacitors to the light emitting devices. This process enables all the light emitting devices to emit light at the same time for each block. After that, when application of the gate-on pulses to the first gate line block ($G_{11}$, $G_{12}$, $G_{13}$) is started, electric charges start being charged again into the charge storing capacitors. Then, when application of the gate-on pulses to the connecting lines $S_1$, $S_2$ and $S_3$ is started, the electric charges start being backward discharged from the charge storing capacitors with respect to the light emitting devices.

Likewise, a series of operation steps are repeated for the second gate line block ($G_{21}$, $G_{22}$, $G_{23}$) and a third gate line block ($G_{31}$, $G_{32}$, $G_{33}$) successively, thereby completing one main scan.

Figure 8:
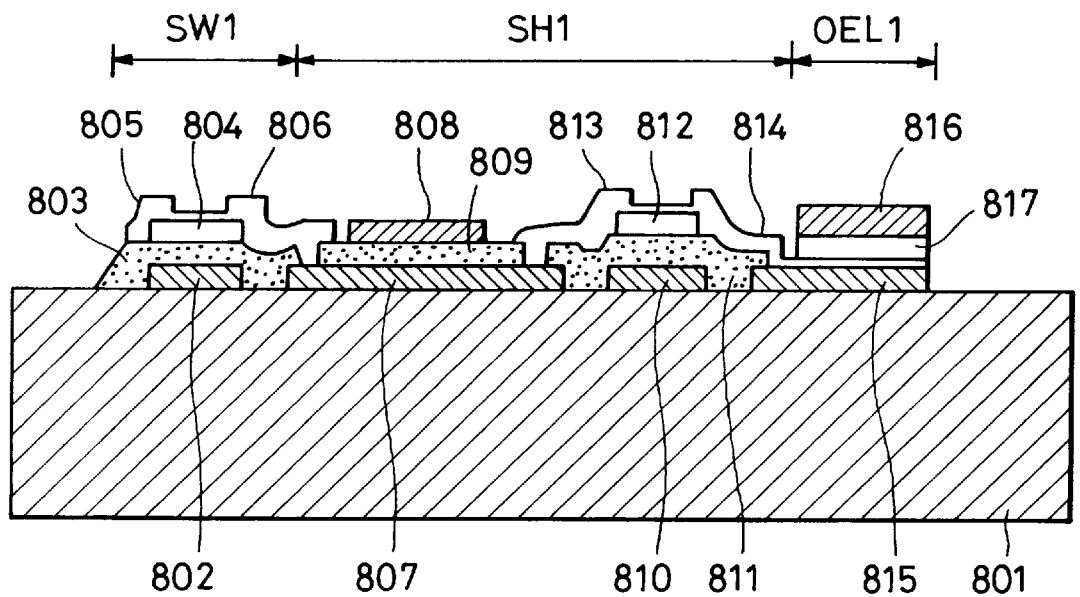
FIG. 8 is a sectional view of a light emitting device structure for use in conjunction with the present invention.

FIG. 8 is a sectional view of a light emitting device structure for 1 bit used in the circuit shown in FIG. 4. In FIG. 8, denoted by 801 is a substrate made of an insulating material such as glass or plastics. On the substrate 801, there are formed a switching device portion SW1, a sample-and-hold circuit portion SH1 and a light emitting device portion OEL1. The switching device portion SW1 has a first transistor structure region made up of a gate electrode 802, a gate insulating film 803, a thin film semiconductor layer 804, a source electrode 805, and a drain electrode 806. The sample-and-hold circuit portion SH1 has a charge storing capacitor region made up of a pair of electrodes 807, 808 and an insulating film 809 interposed between the pair of electrodes, and a second transistor structure region made up of a gate electrode 810, a gate insulating film 811, a thin film semiconductor layer 812, a source electrode 813, and a drain electrode 814. The light emitting device portion OEL1 is made up of a pair of electrodes 815, 816 and a light emitting layer 817 interposed between the pair of electrodes.

In the present invention, the thin film semiconductor layers 804 and 812 in the first and second transistor structure region may be formed of thin film amorphous silicon, thin film polycrystalline silicon, or thin film single-crystal silicon. The gate insulating films 803 and 811 may be formed of a thin film silicon nitride or a thin film tantalum oxide. One of the pair of the electrodes constituting the light emitting device portion OEL1 serves as an anode and the other serves as a cathode. It is preferable that one electrode through which light emitted from the light emitting device passes be formed of a transparent conductive film of, e.g., ITO (indium tin oxide) or tin oxide, and the other electrode is formed of a reflecting metal film of, e.g., aluminum, silver, zinc, gold or chromium.

Also, in the present invention, the light emitting layer is preferably covered by a sealing material for the purpose of avoiding deterioration of the light emitting layer. The sealing material may comprise an inorganic insulating substance such as silicon oxide or silicon nitride, or an organic insulating resin such as epoxy.

The light emitting layer 817 used in the present invention is preferably formed of an organic electroluminescent (OEL) material, but may be formed of an inorganic electroluminescent (EL) material within the scope of the present invention.

Specific examples of OEL materials usable in the present invention are listed below.

The OEL materials usable in the present invention include those disclosed in EPA 349,265 (1990) of Scozzafava; U.S. Pat. No. 4,356,429 of Tang; U.S. Pat. No. 4,539,507 of VanSlyke et. al.; U.S. Pat. No. 4,769,292 of Tang, et. al.; U.S. Pat. No. 4,885,211 of Tang, et. al.; U.S. Pat. No. 4,950,950 of Perry, et. al.; U.S. Pat. No. 5,059,861 of Littman, et. al.; U.S. Pat. No. 5,047,687 of VanSlyke; U.S. Pat. No. 5,073,446 of Scozzafava, et. al.; U.S. Pat. No. 5,059,862 of VanSlyke et. al.; U.S. Pat. No. 5,061,617 of VanSlyke et. al.; U.S. Pat. No. 5,151,629 of VanSlyke; U.S. Pat. No. 5,294,869 of Tang, et. al.; and U.S. Pat. No. 5,294,870 of Tang, et. al. The light emitting (i.e., luminescent (EL)) layer comprises an organic hole injection and transport band in contact with the anode, and an electron injection and transport band which forms a junction in cooperation with the organic hole injection and transport band. The organic hole injection and transport band may be formed of a single material or a plurality of materials. The hole injection and transport band is made up of the anode, a continuous hole transport layer interposed between a hole injection layer and the electron injection and transport band, and the hole injection layer in contact with the hole transport layer. Likewise, the electron injection and transport band may be formed of a single material or a plurality of materials. The electron injection and transport band is made up of the anode, a continuous electron transport layer interposed between an electron injection layer and the hole injection and transport band, and the electron injection layer in contact with the electron transport layer. Recombination of holes and electrons and resulting luminescent occur in the electron injection and transport band adjacent to the junction between the hole injection and transport band and the electron injection and transport band. Compounds forming the OEL layer are typically deposited by evaporation, by may be deposited by any of other suitable conventional processes.

In the preferred embodiment of the present invention, the organic material used to form the hole injection layer is expressed by the following general formula;

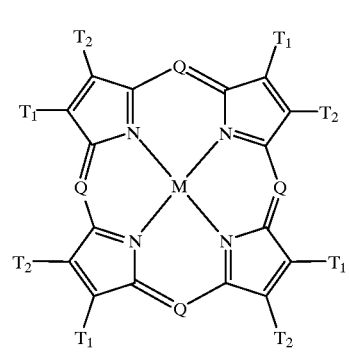

<Formula 1> wherein:

Q represents N or C—R, R being a hydrogen atom or an alkyl radical;

M represents a metal, metal oxide or metal halide; and

T1, T2 both represent either hydrogen or an unsaturated benzene ring containing a substituent such as alkyl or halogen. A preferable alkyl portion contains a carbon atom in number from about 1 to 6, while phenyl constitutes a preferable allyl portion.

In the preferred embodiment, the hole transport layer is made of aromatic tertiary amine. A preferable subclass of the aromatic tertiary amine contains tetraallyldiamine having the formula below:

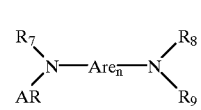

<Formula 2>

Here, "Are" represents an allylene group, n represents an integer from 1 to 4, and Ar, $R_7$, $R_8$ and $R_9$ each represent a selected allyl group. In the preferred embodiment, the EL layer and the electron injection and transport band each contain a metal oxinoid compound. A preferable example of the metal oxinoid compound is expressed by the following general formula:

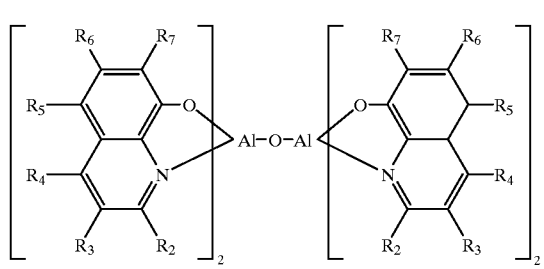

<Formula 3>

Here, $R_2$–$R_7$ each represent a substitutability. In the preferred embodiment, the metal oxinoid compound is expressed by the following formula:

<Formula 4>

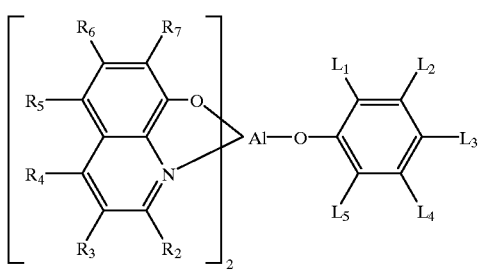

Here, $R_2$–$R_7$ are as defined above, and $L_1$–$L_5$ represent either hydrogen or a carbohydrate group which contains a carbon atom in number equal to or less than 12 in concentrated form with $L_1$–$L_5$ containing different numbers of carbon atoms from 1 to 12. $L_1$, $L_2$ or $L_2$, $L_3$ are both able to form coupled benzene rings. In another preferred embodiment, the metal oxinoid compound is expressed by the following formula:

<Formula 5>

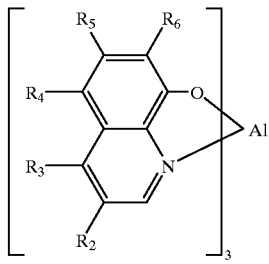

Here, $R_2$–$R_6$ each represent hydrogen or any other substitutability. The above examples just represent preferable organic materials to be used in the EL layer. It should be therefore understood that the above examples are not intended to restrict the scope of the present invention, but provide the OEL layer in general terms. As will be seen from the above examples, the OEL materials contain a coordination compound having an organic ligand.

For the segment electrode 815 of the light emitting device used in the present invention, a reflecting metal such as aluminum, silver, zinc, gold or chromium can be used. For the counter electrode 816, a transparent electrode made of, e.g., ITO (indium tin oxide) or tin oxide, can be used.

For the sealing material used in the present invention, an inorganic insulating substance such as silicon oxide or silicon nitride, or an organic insulating resin such as epoxy can be used. For a passivation film used in the present invention, an inorganic insulating substance such as silicon oxide or silicon nitride, or an organic insulating resin such as epoxy can also be used.

In the image forming apparatus of the present invention, photosensitive layers of the photosensitive members 1a, 1b, 1c and 1d may be formed of organic photoconductive materials such as benzooxazol based photosensitive materials, benzothiazole based photosensitive materials and toriphenylamine photosensitive materials, or inorganic photoconductive materials such as amorphoussilicon (a-Si) photosensitive materials, amorphous silicon-germanium alloy (a-SiGe) photosensitive materials, and amorphous silicon-germanium alloy (a-SiGe) photosensitive materials.

On the light emitting device fabricated as explained above, silicon nitride is deposited in a thickness of 150 nm by sputtering to form a passivation layer for sealing off. Incidentally, the process from the step of forming the organic layer to the step of forming the passivation layer is carried out within the same vacuum system.

Anode materials of the organic light emitting device preferably have a work function as large as possible. In addition to ITO used in the embodiment, examples of the anode materials include tin oxide, gold, platinum, palladium, selenium, iridium, copper iodide, etc.

On the other hand, cathode materials preferably have a work function as small as possible. In addition to Mg/Ag used in the embodiment, examples of the cathode materials include Mg, Al, Li, In, ally of these elements, etc.

For the hole transport layer, hole transportable compounds listed below can be used in addition to TPD.

Besides organic materials, the hole transport layer may be made of inorganic materials. Examples of usable inorganic materials include a-Si, a-SiC, etc.

For the electron transport layer, electron transportable compounds listed below can be used in addition to $Alq_3$.

Additionally, any of dopant dyes shown in Formula 15 below may be doped into the electron transport layer or the hole transport layer.

It is desired that the materials of the organic light emitting device be selected to have a luminescent spectrum in match with sensitivity of the photosensitive drum used.

<Formula 6>

Hole Transportable Compounds

Hole Transporter

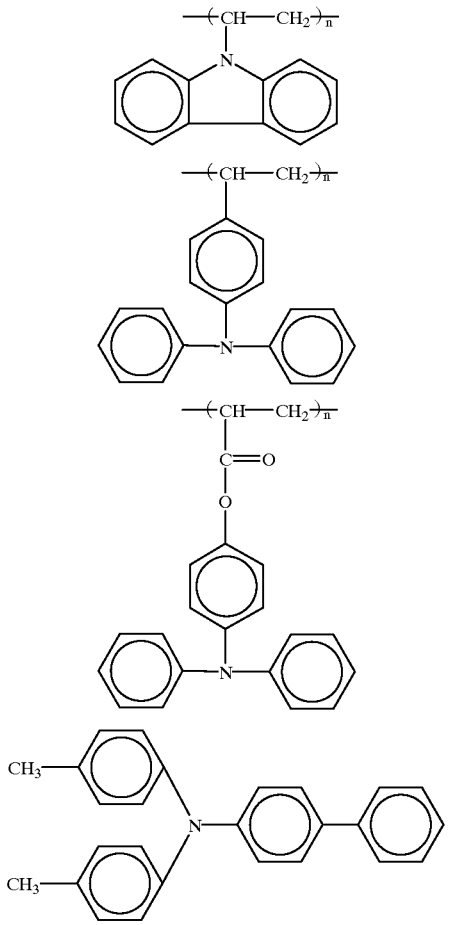

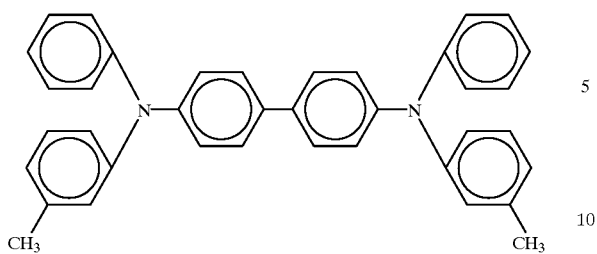
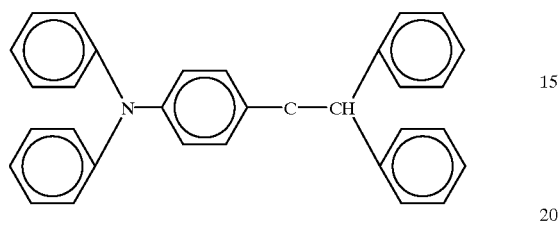
<Formula 7>
Hole Transportable Compounds
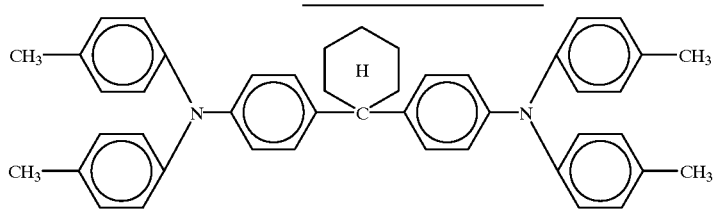
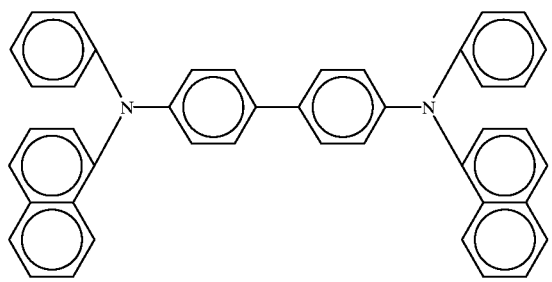
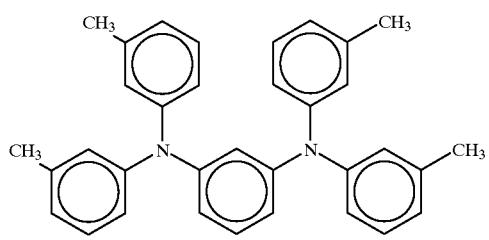
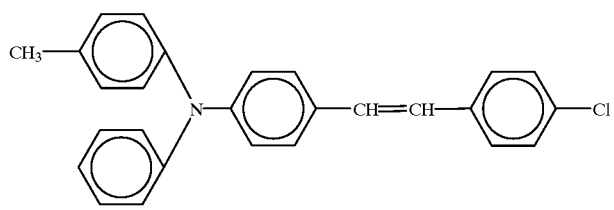

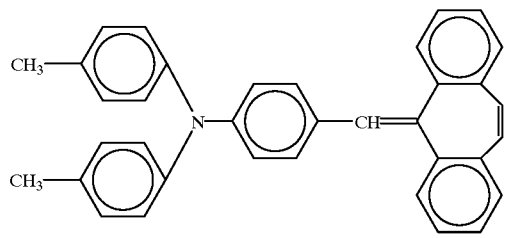
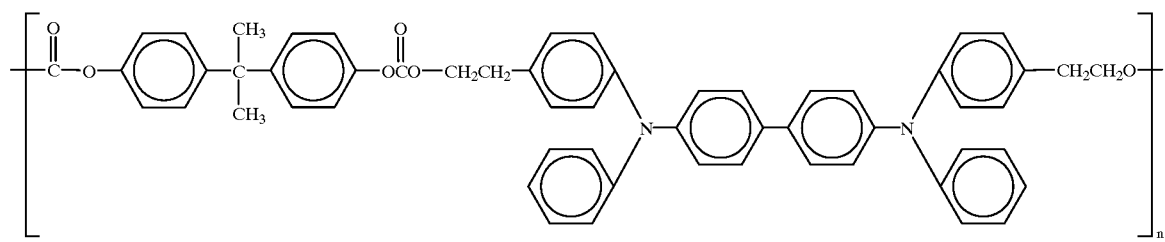
<Formula 8>
Hole Transportable Compounds
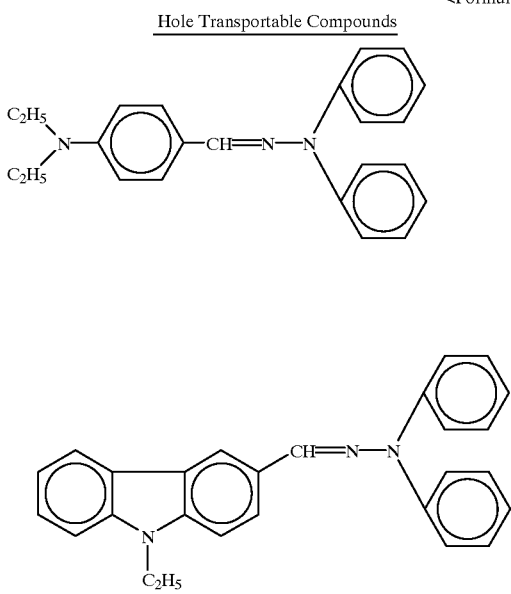
<Formula 9>
Hole Transportable Compounds
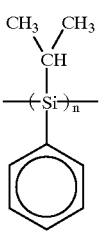
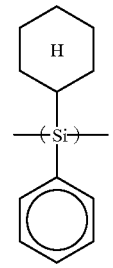
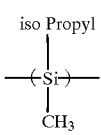
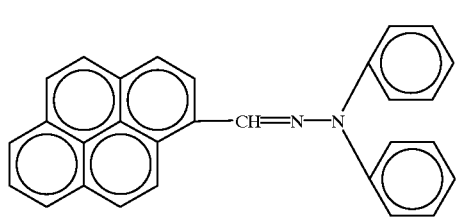
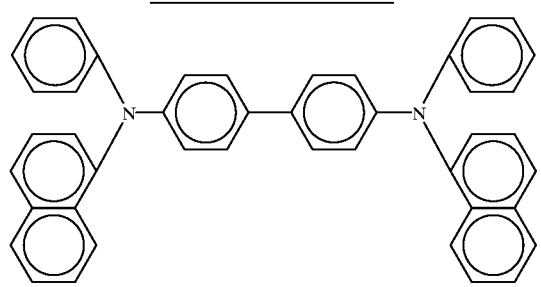
<Formula 10>
Hole Transportable Compounds

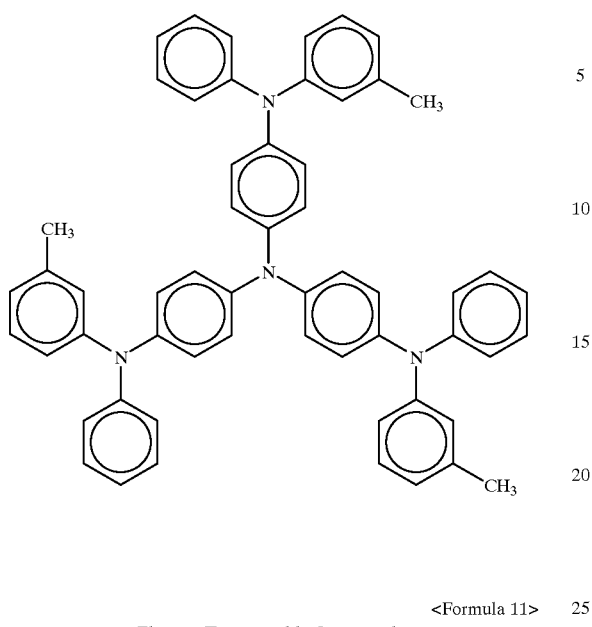
<Formula 11>
Electron Transportable Compounds
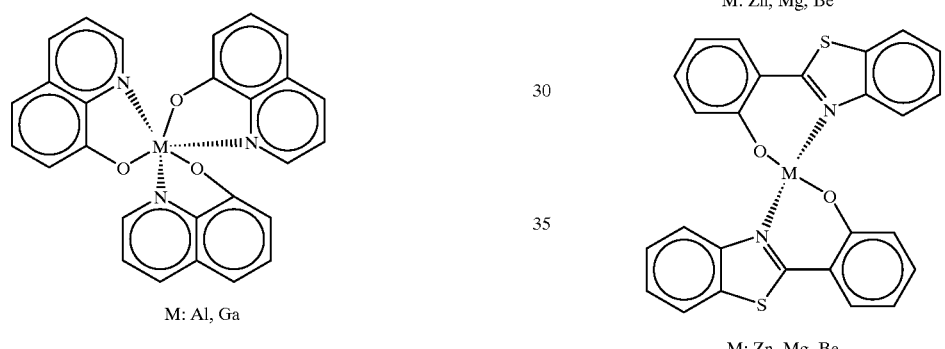
<Formula 12>
Electron Transportable Compounds
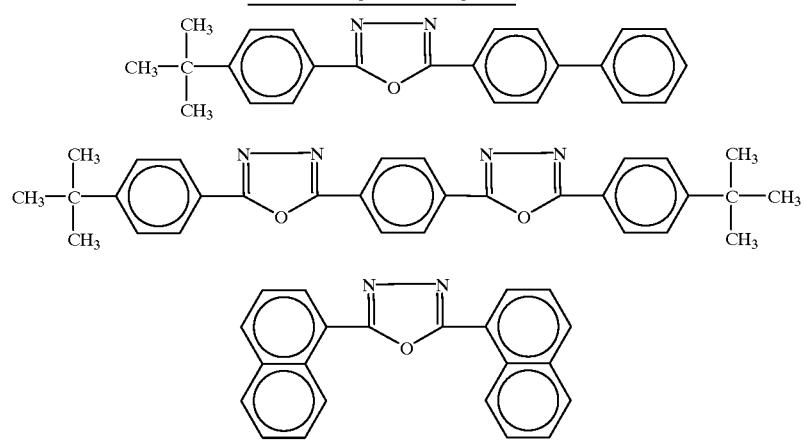

-continued
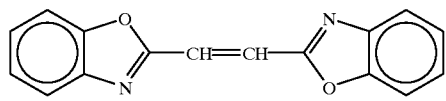
<Formula 13>
Electron Transportable Compounds
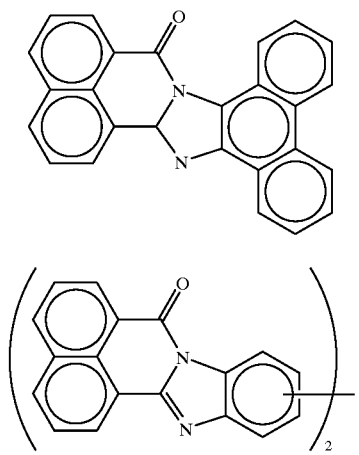
-continued
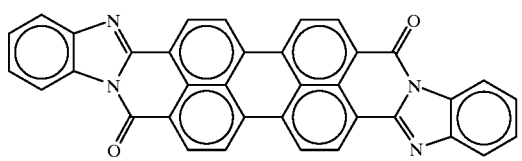
<Formula 14>
Electron Transportable Compounds
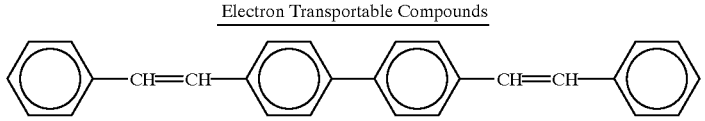
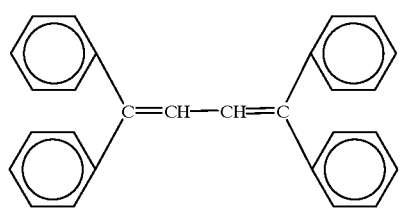
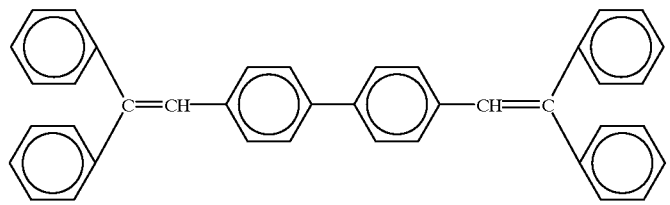
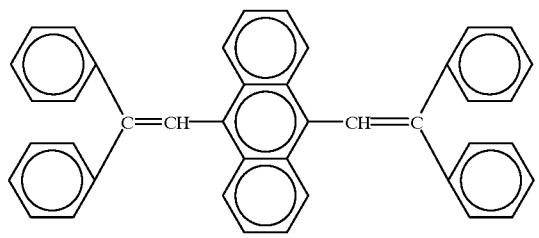

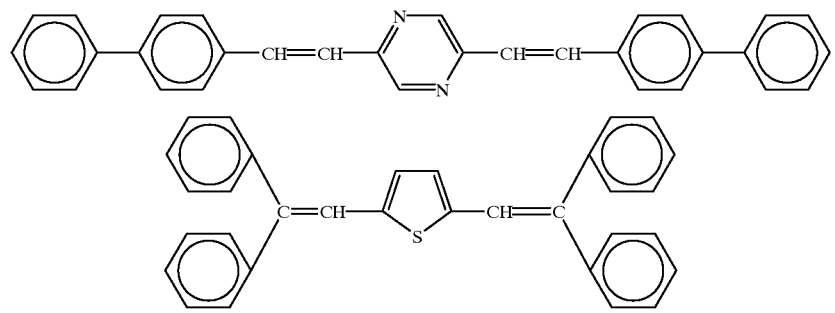

<Formula 15>

Dopant Dyes

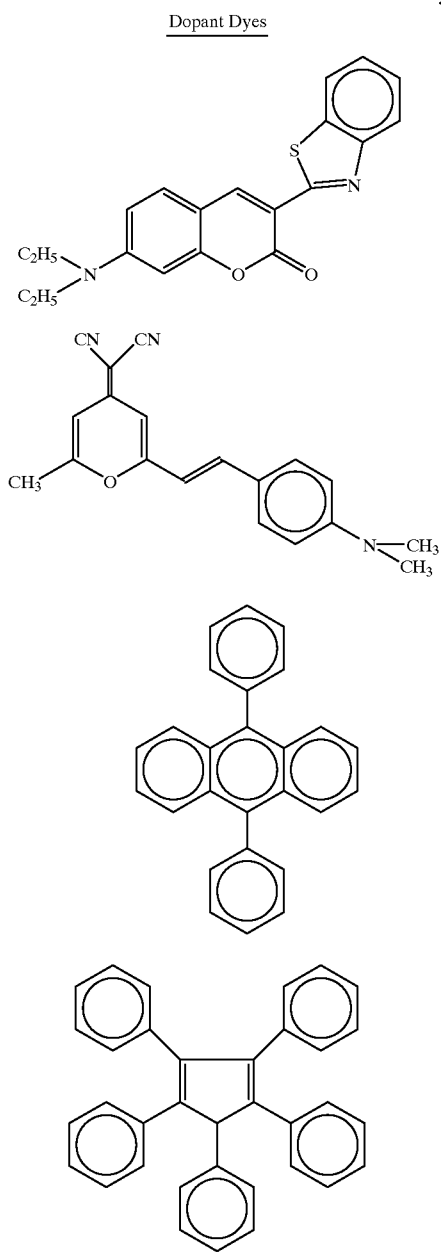

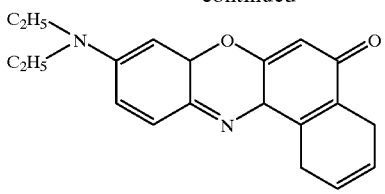

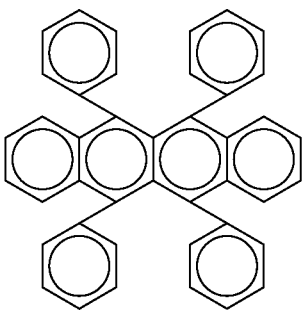

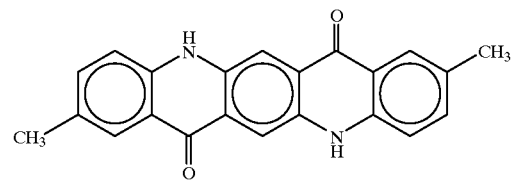

Figure 9:
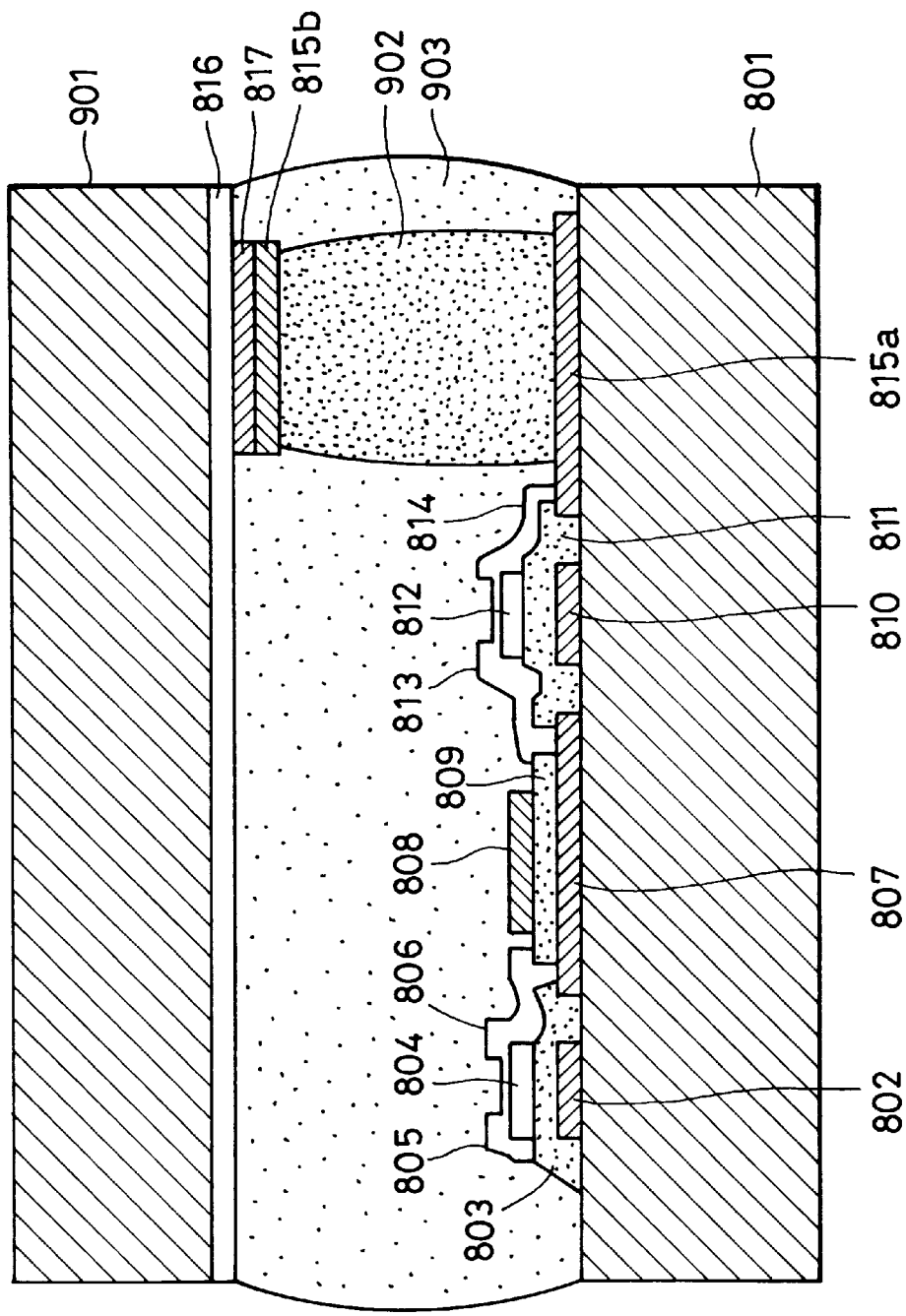
FIG. 9 is a sectional view of a light emitting device structure for use in conjunction with the present invention.

FIG. 9 shows another preferable light emitting device structure for use in the present invention. A switching device portion and a sample-and-hold circuit portion, which are similar to those SW1 and SH1 used in FIG. 8, are formed on an upper surface of a lower substrate 801. On a lower surface of an upper substrate 901 (insulating substrate made of glass or the like), there are formed a pair of electrodes 816, 815b and a light emitting layer 817 interposed between the pair of electrodes for constituting a light emitting portion of 1 bit. The pair of substrates 801, 901 are disposed parallel in opposing relation with the electrodes, etc. on their one surfaces facing inward. An electrode 815a on the substrate 801 and the electrode 815b on the substrate 901 are electrically connected to each other using a conductive adhesive (adhesive electrical connector) 902.

As the adhesive electrical connector 902 is used a conductive adhesive prepared by dispersing conductive particles, such as particles of carbon, silver or copper, in an epoxy or phenol based thermosetting adhesive. The conductive adhesive is coated on one or both of the upper and lower substrates 901, 801 in predetermined positions by screen printing, offset printing or dispenser coating. The coated conductive adhesive is then dried to finally provide the adhesive electrical connector 902.

For the purpose of intensifying interface bonding forces, the conductive adhesive may contain a silane coupler such as N-(2-aminoethyl)-3-aminopropylmethyldimethoxysilane, N-(2-aminoethyl)-3-aminopropyltrimethoxysilane, 3-aminopropyltrimethoxysilane, 3-aminopropylmethyldimethoxysilane, or -glycideoxypropyltrimethoxysilane.

Another example of materials of the adhesive electrical connector 902 is a solder or the like.

An adhesive electrical insulator 903 is disposed around the adhesive electrical connector 902. The adhesive electrical insulator 903 is provided by coating an epoxy or phenol based insulating adhesive on one or both of the upper and lower substrates 901, 801 in predetermined positions by screen printing, offset printing or dispenser coating, followed by drying the coated insulating adhesive. The steps of coating the conductive adhesive and the insulating adhesive are preferably carried out such that the insulating adhesive is coated on one of the upper and lower substrates 901, 801, while the conductive adhesive is coated on the other substrate on which the insulating adhesive is not coated.

In the present invention, the space between the upper and lower substrates 901, 801 may be filled with, instead of the adhesive electrical insulator 903, an insulator having no bonding forces, e.g., an organic solvent, in particular, a liquid insulator such as an organic solvent having a high melting point or a liquid crystal including nematic, cholesteric and smetic liquid crystals.

Further, the adhesive electrical insulator 903 or the non-adhesive electrical insulator may additionally contain colorants, such as colored pigment or paint, to exhibit a light shielding effect as well.

Figure 10:
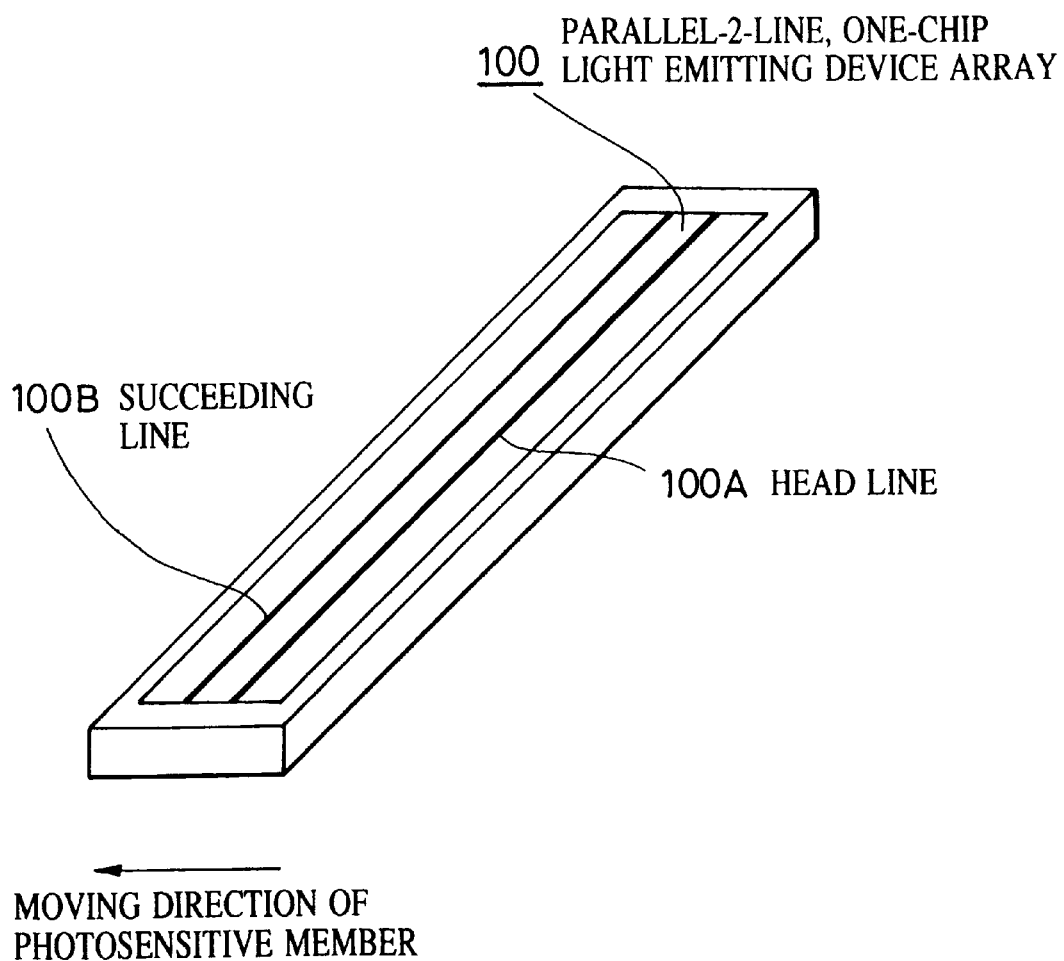
FIG. 10 is a perspective view of a one-chip light emitting device array for use in conjunction with the present invention.

FIG. 10 shows another preferred embodiment of the one-chip light emitting device array for use in the present invention. A light emitting apparatus shown in FIG. 10 comprises a parallel-2-line, one-chip light emitting device array 100 having two separate light emitting device arrays lying parallel to each other as a head line 100A and a succeeding line 100B. Preferably, the one-chip light emitting device array 100 is used to expose an entire main scan line of a photosensitive drum.

FIG. 11 is an equivalent circuit diagram of the one-chip light emitting device array 100 shown in FIG. 10. The light emitting device arrays corresponding to the head line 100A and the succeeding line 100B can be each constructed of a similar equivalent circuit as that used for the array shown in FIG. 3.

More specifically, the light emitting device arrays corresponding to the head line 100A and the succeeding line 100B are constructed as follows. A plurality of light emitting devices OEL11, OEL12, OEL13, OEL14, etc. constituting the head line 100A and a plurality of light emitting devices OEL21, OEL22, OEL23, OEL24, etc. constituting the succeeding line 100B are arranged in each of two lines parallel to each other extending in the direction of main scan across the moving direction of the photosensitive drum when the photosensitive drum is mounted in an electrophotographic copying machined and rotated, the light emitting devices in each line being connected to form an active matrix circuit. In the active matrix circuit of the head line 100A, thin film transistors are suitably used as switching devices SW11, SW12, SW13, SW14, etc. A group of light emitting devices (first group) defined as comprising the light emitting devices OEL11, OEL13, . . . , OEL1(2N−1) in odd number positions are connected to respective gate terminals of the switching devices SW11, SW13, . . . , SW1(2N−1) in odd number positions and then connected in common to a gate line $G_{(100A)}1$. A group of light emitting devices (second group) defined as comprising the light emitting devices OEL12, OEL14, . . . , OEL1(2N) in even number positions are connected to respective gate terminals of the switching devices SW12, SW14, . . . , SW1(2N) in even number positions and then connected in common to a gate line $G_{(100A)}2$. Further, in the active matrix circuit, pairs of the adjacent light emitting devices OEL11-OEL12, OEL13-OEL14, . . . , OEL1(2N−1)-OEL1(2N) are connected to respective source terminals of pairs of the adjacent switching devices SW11-SW12, SW13-SW14, . . . , SW1(2N−1)-SW1(2N), and then connected in common to source lines $I_{(100A)}1, I_{(100A)}2$, etc. Counter electrodes of the light emitting devices OEL11, OEL12, OEL13, OEL14, etc. are connected in common to a common line C0 to serve as anodes or cathodes of the light emitting devices OEL11, OEL12, OEL13, OEL14, etc., respectively. Sample-and-hold circuits similar to those used for the array shown in FIG. 3 are connected between the switching devices SW11, SW12, SW13, SW14, etc. and the light emitting devices OEL11, OEL12, OEL13, OEL14, etc. The sample-and-hold circuits have respective charge storing capacitors. The charge storing capacitors in the odd line are connected to sample-and-hold switching devices of which gates are connected to a common connecting line $S_{(100A)}1$, and the charge storing capacitors in the even line are connected to sample-and-hold switching devices of which gates are connected to common connecting line $S_{(100A)}1$, so that the gates of the sample-and-hold switching devices are turned on and off at predetermined time intervals in synch with the rotation of the photosensitive drum.

In the active matrix circuit of the succeeding line 100B parallel to the head line 100A, the light emitting devices OEL21, OEL22, OEL23, OEL24, etc. are connected in a like manner. A group of light emitting devices (first group) defined as comprising the light emitting devices OEL21, OEL23, . . . , OEL2(2N−1) in odd number positions are connected to respective gate terminals of the switching devices SW21, SW23, . . . , SW2(2N−1) in odd number positions and then connected in common to a gate line $G_{(100B)}1$. A group of light emitting devices (second group) defined as comprising the light emitting devices OEL22, OEL24, . . . , OEL2(2N) in even number positions are connected to respective gate terminals of the switching devices SW22, SW24, . . . , SW2(2N) in even number positions and then connected in common to a gate line $G_{(100B)}2$. Further, in the active matrix circuit, pairs of the adjacent light emitting devices OEL21-OEL22, OEL23-OEL24, . . . , OEL2(2N−1)-OEL2(2N) are connected to respective source terminals of pairs of the adjacent switching devices SW21-SW22, SW23-SW24, . . . , SW2(2N−1)-SW2(2N), and then connected in common to source lines $I_{(100B)}1, I_{(100B)}2$, etc. Counter electrodes of the light emitting devices OEL21, OEL22, OEL23, OEL24, etc. are connected in common to a common line C0 to serve as anodes or cathodes of the light emitting devices OEL21, OEL22, OEL23, OEL24, etc., respectively. Also as with the active matrix circuit for the head line 100A, sample-and-hold circuits are connected between the switching devices SW21, SW22, SW23, SW24, etc. and the light emitting devices OEL21, OEL22, OEL23, OEL24, etc., and have respective charge storing capacitors. The charge storing capacitors in the odd line are connected to sample-and-hold switching devices of which gates are connected to a common connecting line $S_{(100B)}2$, and the charge storing capacitors in the even line are connected to sample-and-hold switching devices of which gates are connected to a common connecting line $S_{(100B)}2$.

In the light emitting apparatus of this embodiment described above, those ones of the light emitting devices lying in the head line 100A and the light emitting devices lying in the head line 100B, which are adjacent to each other, are preferably arranged parallel in the moving direction of the photosensitive member, i.e., in the direction of sub-scan of the photosensitive drum.

Figure 12:
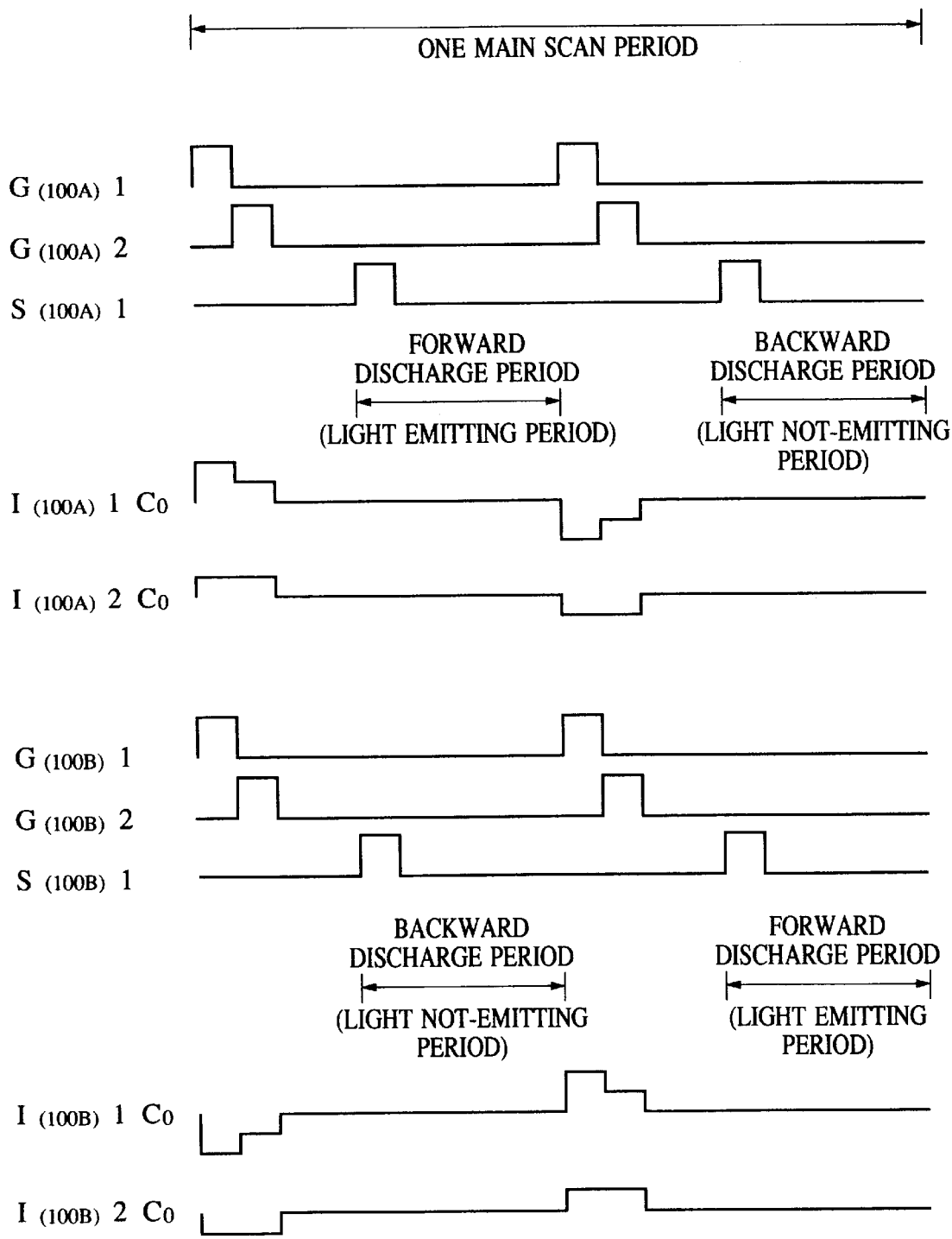
FIG. 12 is a chart of a driving sequence for the light emitting device array shown in FIG. 11.

FIG. 12 is a chart of a driving sequence for operation of the light emitting device array shown in FIGS. 10 and 11. In the driving sequence of FIG. 12, during the operation of the light emitting device arrays of the head line 100A and the head line 100B, voltages applied to the source lines $I_{(100A)}1$, 2, etc. and the source lines $I_{(100B)}1$, 2, etc., which are respectively connected to light emitting devices adjacent to each other, are set to have opposite polarities. It is particularly preferable that the applied voltages are set to become zero in average value.

As described above, according to the present invention, the aforesaid problems experienced in the related art are overcome. Specifically, by employing the novel one-chip light emitting device array of the present invention instead of the conventional linked LED device, it is possible to reduce the cost of a light emitting device array section in the image forming apparatus, and to improve color reproducibility in the direction of main scan. Also, since four one-chip light emitting device arrays, which are disposed for the photosensitive members in one-to-one relation, are obtained by being cut from a single board, the four one-chip light emitting device arrays exhibit luminescent characteristics substantially equal to each other, the need of compensating for differences in luminescent characteristics of the individual arrays is reduced, and the production cost can be greatly reduced.

Further, according to the present invention, the luminance of light emitted from the light emitting device can be greatly increased, and the process speed of electrophotographic copying machines can be greatly improved. Concurrently, it is also possible to greatly reduce the number of driver ICs and the number of leads which are required to be disposed in a print head. As a result, a color electrophotographic copying machines can be achieved with a reduced cost.

The invention has been described with respect to particular illustrative embodiments. It is to be understood that the invention is not limited to the above described embodiments and that various changes and modifications may be made by those of ordinary skill in the art without departing from the spirit and scope of the invention.

What is claimed is:

1. An image forming apparatus comprising:
    (a) a photosensitive member;
    (b) exposure means comprising a light emitting element array which has a plurality of light emitting elements provided in the main scanning direction to the moving direction of the photosensitive member, a switching element array having a plurality of switching elements arranged so that a switching element is connected to each of said light emitting elements, a first group of leads, dividing said switching element array into a first group made of the switching elements for a first order and a second group made of the switching elements for a second order, the first group of leads made of a first gate line for the first order and a second gate line for the second order such that a plurality of switching elements in one switching element group are connected for every one divided switching element group, a second group of leads, connecting said switching elements of the first gate line and the second gate line to each other and dividing said switching element array into the first group and the second group made of the switching elements for the first order and the switching elements for the second order, respectively, the second group of leads made of a plurality of source lines commonly connected to a source terminal of a plurality of switching elements in one switching element group for every divided one switching element, a capacitor which charges electrical signals from said second group of leads via said switching elements and a simultaneous light emitting circuit for causing light to emit from said light emitting array simultaneously, thereby causing to discharge said capacitor simultaneously, said exposure means for executing exposure to said photosensitive member by the simultaneous light emission from said light emitting element array; and
    (c) drive means for applying a plurality of scan signals for a first time to said first group of leads in order and then to gate terminals of switching elements on the gate line to which the scan signals for each of said first group of leads is in an ON state, causing to charge the capacitor with voltage signals of a first polarity corresponding to image information from the second group of leads in this ON state period and to operate said simultaneous light emitting circuit in order to discharge said capacitor simultaneously, and successively for applying the scan signals for a second time to said first group of leads in order and then to the gate terminals of switching elements on the gate line to which the scan signals for each of said first group of leads is in the ON state, causing to charge a capacitor with voltage signals of a second polarity from the second group of leads in this ON state period and to operate said simultaneous light emitting circuit in order to discharge said capacitor simultaneously.

2. The image forming apparatus according to claim 1, wherein said light emitting devices each comprise a device having an organic electroluminescent element.

3. The image forming apparatus according to claim 1, wherein said photosensitive member comprises an electrophotographic photosensitive member.

4. The image forming apparatus according to claim 3, wherein said photosensitive member comprises an organic electrophotographic photosensitive member.

5. The image forming apparatus according to claim 3, wherein said photosensitive member comprises an inorganic electrophotographic photosensitive member.

6. The image forming apparatus according to claim 5, wherein said inorganic electrophotographic photosensitive member comprises an electrophotographic photosensitive member made of amorphous silicon.

7. The image forming apparatus according to claim 1, wherein said switching device array is in a one-chip form.

8. An image forming apparatus according to claim 1, wherein said first order and said second order are respectively the odd order and the even order.

9. A light emitting apparatus comprising:
    (a) light emitting means comprising a light emitting array having a plurality of light emitting elements provided in one direction, a switching element array having a plurality of switching elements arranged so that one switching element is connected to each of said light emitting elements, a first group of leads, dividing said switching element array into a first group made of switching elements of a first order and a second group made of switching elements of a second order, the first group of leads made of a first gate line for the first order and a second gate line for the second order, which are connected to gate terminals of the plurality of switching elements in said one switching element group for every one divided switching element group, a second group of leads, connecting said switching arrays of the first gate line and the second gate line to each other and dividing said switching element array into the first and second groups made of the switching elements for the first order and the switching elements for the second order, respectively, the second group of leads made of a plurality of source lines connected to source terminals of a plurality of switching elements in said one switching group for said one divided switching element group, a capacitor which charges electrical signals from said second group of leads, and a plurality of simultaneous light emitting circuits for emitting light from said light emitting elements simultaneously, thereby causing to discharge said capacitor simultaneously via said switching elements, wherein said light emitting means is for executing simultaneous emission from said light emitting element array;

(b) first drive means for operating said respective light emitting elements in order; and (c) second drive means for operating said simultaneous light emitting circuits to apply a plurality of scan signals for the first time to said first group of leads in order, and then to gate terminals of the switching elements on the gate line to which the scan signals of each of said first group of leads is applied is in an ON state, thereby causing to charge the capacitor with electrical voltage of a first polarity corresponding to image information from the second group of leads in the ON period and to operate said simultaneous light emitting circuits in order to discharge said capacitor simultaneously after that and successively to apply the scan signals for the second time to said first group of leads in order and then to the gate terminals of the switching elements on the gate line to which the scan signals of each of said first group of leads is applied is in the ON state, thereby causing to charge the capacitor with voltage signals of a second polarity from the second group of leads in this ON state period and to operate said simultaneous light emitting circuits in order to discharge said capacitor simultaneously.

10. The light emitting apparatus according to claim 9, wherein said light emitting devices each comprise a device having an organic electroluminescent element.

11. The light emitting apparatus according to claim 9, wherein said switching devices comprise thin film transistors with said first terminals serving as gate terminals and said third terminals serving as source terminals.

12. The light emitting apparatus according to claim 9, wherein said switching device array is in a one-chip form.

13. The light emitting apparatus according to claim 9, wherein said simultaneous light emitting circuits include sample-and-hold circuits.

14. An image forming apparatus comprising:

(a) a photosensitive member;

(b) exposure means comprising a light emitting element array, which has a plurality of light emitting elements provided in the main scanning direction to the moving direction of the photosensitive member and divides said provided plurality of light emitting elements into a plurality of light emitting element array blocks made of said divided plurality of light emitting elements, a switching element array having a plurality of switching elements arranged so that one switching element is connected to each said light emitting element in each light emitting element array block, a first group of leads, dividing said switching element array into a first group made of switching elements for a first order and a second group made of switching elements for a second order, the first group of leads made of a first gate line for the first order and a second gate line for the second order connecting commonly to gate terminals of a plurality of switching elements in said one switching element group for every said divided one switching element, a second group of leads, connecting said switching element array with the first gate line and the second gate line to each other and dividing into the first group and the second group made of the switching elements for the first order and the switching elements for the second order, respectively, the second group of leads made of a plurality of source lines connecting commonly to source terminals of a plurality of switching elements in said one switching element group for every divided one group of switching elements, a capacitor which charges electrical signals from said second group of leads via said switching elements, a simultaneous light emitting circuit which causes light to emit from said light emitting element array, thereby causing to discharge said capacitor simultaneously, said exposure means for executing exposure to said photosensitive member;

(c) first drive means for operating said respective light emitting element array blocks in order; and (d) second drive means for applying a plurality of scan signals for the first time to said first group of leads, and then to the gate terminals of the switching elements on the gate line to which the scan signals of each of said first group of leads are applied are in an ON state, thereby causing to charge the capacitor with voltage signals of a first polarity corresponding to image information from the second group of leads in this ON state period and to operate said simultaneous light emitting circuit in order to discharge said capacitor simultaneously after that, and successively applying the scan signals for the second time to said first group of leads and then to the gate terminals of switching elements on the gate line to which the scan signals for each of said first group of leads are applied is in the ON state, thereby causing to discharge the capacitor with voltage signals of a second polarity from the second group of leads and to operate said simultaneous light emitting circuit in order to discharge said capacitor simultaneously.

15. An image forming apparatus according to claim 14, wherein said first order and said second order are respectively the odd order and the even order.

16. An image forming apparatus comprising:

(a) a photosensitive member;

(b) exposure means comprising a light emitting element array which has a plurality of light emitting elements provided in a plurality of rows and lines with respect to the photosensitive member, a switching element array made of a plurality of switching elements arranged in a plurality of rows and lines such that one switching element is connected to each of said light emitting elements, a first group of leads, dividing the switching elements for each line into a first group made of the switching elements for a first order and a second group made of the switching elements for a second order in said switching element array, the first group of leads made of a first gate line for the first order and a second gate line for the second order connecting commonly to gate terminals of a plurality of switching elements in said one switching element group for every divided one switching element, a second group of leads, connecting the switching elements of each different line in said switching element array to each other and dividing the switching element array into the first group made of the switching elements for the first order and the second group made of the switching elements for the second order, the second group of leads made of a plurality of source lines connected to a plurality of source terminals corresponding to the plurality of switching elements in said one switching element group for every divided one switching element group, a capacitor which charges electrical signals from said second group of leads via said switching elements and a simultaneous light emitting circuit which causes light to emit from said light emitting array simultaneously, thereby causing to discharge said capacitor simultaneously, said exposure means for executing exposure to said photosensitive member by simultaneous light emission from said light emitting element array; and (c) drive means for operating said simultaneous light emitting circuits to apply a plurality of scan signals for a first time to said first group of leads corresponding to each line in order and then to the gate terminals of the switching elements on the gate line to which the scan signals for each of said first group of leads is applied is in an ON state, thereby causing to charge a capacitor with voltage signals with a first polarity corresponding to image information from the second group of leads in this ON period and to operate said simultaneous light emitting circuits in order to discharge said capacitor simultaneously after that, and successively to apply the scan signals for the second time to said first group of leads and then to the gate terminals of the switching elements on the gate line to which the scan signals of each of said first group of leads is applied is in the ON state, thereby causing to charge the capacitor with voltage signals of a second polarity from the second group of leads in this ON period and to operate said simultaneous light emitting circuits in order to discharge said capacitor simultaneously after that.

17. An image forming apparatus according to claim 16, wherein said first order and said second order are respectively the odd order and the even order.

18. A light emitting apparatus comprising:

(a) light emitting means comprising a light emitting element array having a plurality of light emitting elements arranged in a plurality of rows and lines, a switching element array comprised of a plurality of switching elements so that one switching element is connected to each said light emitting element, the switching elements disposed on the plurality of rows and lines, a first group of leads, dividing the switching elements for each of the lines in said switching element array into a first group made of the switching elements of a first order and a second group made of the switching elements of a second order, the first group of leads made of a first gate line for the first order and a second gate line for the second order to which gate terminals of the plurality of switching elements in said one switching element group are commonly connected, a second group of leads, connecting the switching elements for each line of the first gate line and the second gate line to each other in said switching element array and further dividing the switching element array into the first group made of the switching elements for the first order and the second group made of the switching elements for the second order, the second group of leads made of a plurality of source lines commonly connected to source terminals of the plurality of switching elements in said one switching element group for each said one divided switching element group, a capacitor which charges electrical signals from said second group of leads via said switching elements, and a plurality of simultaneous light emitting circuits for emitting light from said light emitting element array simultaneously, thereby causing to discharge said capacitor simultaneously, said light emitting means for executing simultaneous emission from said light emitting element array; and (b) drive means for applying a plurality of scan signals for the first time to said first group of leads of each of said lines and then to gate terminals of switching elements on the gate line to which the scan signal of each of said first group of leads is in an ON state, causing to charge the capacitor with voltage signals of a first polarity corresponding to image information from the second group of leads and after that to operate said simultaneous light emitting circuits in order to discharge said capacitor simultaneously, and successively for applying the scan signals for a second time to said first group of leads and then to the gate terminals of the switching elements on the gate line to which the scan signals of each of said first group of leads is applied, causing to charge said capacitor with voltage signals of a second polarity from the second group of leads in this ON state period and to operate said simultaneous light emitting circuit in order to discharge said capacitor simultaneously after that.

* * * * *

UNITED STATES PATENT AND TRADEMARK OFFICE
CERTIFICATE OF CORRECTION

PATENT NO. : 6,121,994
DATED : September 19, 2000
INVENTOR(S) : Kuribayashi et al.

It is certified that error appears in the above-identified patent and that said Letters Patent is hereby corrected as shown below:

Column 10,
Line 39, "machined" should read -- machine --.

Column 13,
Line 55, "luminescent" should read -- luminescence --; and
Line 59, "evaporation, by" should read -- evaporation, but --.

Column 15,
Line 62, "amorphoussilicon" should read -- amorphous silicon --.

Column 16,
Line 13, "ally" should read -- alloy --.

Column 26,
Line 54, "surfaces" should read -- surface -- ; and
Line 59, "As the" should read -- ¶As the --.

Column 27,
Line 9, "Another" should read -- ¶Another -- ;
Line 11, "An adhesive" should read -- ¶An adhesive -- ;
Line 23, "in the" should read -- ¶In the -- ;
Line 29, "smetic" should read -- smectic -- ;
Line 30, "Further," should read -- ¶Further, -- ;
Line 34, "FIG. 10" should read -- ¶FIG. 10 -- ;
Line 43, "FIG. 11" should read -- ¶FIG. 11 -- ;
Line 50, "More" should read -- ¶More -- ; and
Line 60, "machined" should read -- machine --.

Column 28,
Line 34, "In the" should read -- ¶In the --.

UNITED STATES PATENT AND TRADEMARK OFFICE
CERTIFICATE OF CORRECTION

PATENT NO. : 6,121,994
DATED : September 19, 2000
INVENTOR(S) : Kuribayashi et al.

It is certified that error appears in the above-identified patent and that said Letters Patent is hereby corrected as shown below:

<u>Column 29,</u>
Line 4, "In the" should read -- ¶In the -- ;
Line 11, "FIG. 12" should read -- ¶FIG. 12 -- ;
Line 21, "As described" should read -- ¶As described -- ;
Line 37, "Further," should read -- ¶Further, -- ;
Line 44, "machines" should read -- machine -- ; and
Line 45, "The invention" should read -- ¶The invention -- .

Signed and Sealed this

Thirteenth Day of November, 2001

*Attest:*

NICHOLAS P. GODICI
*Attesting Officer*     *Acting Director of the United States Patent and Trademark Office*